United States Patent
Ito

(10) Patent No.: US 7,349,108 B2
(45) Date of Patent: Mar. 25, 2008

(54) STREAK REMOVING IMAGE READING METHOD AND APPARATUS, PROGRAM, AND STORAGE MEDIUM

(75) Inventor: Akio Ito, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1115 days.

(21) Appl. No.: 10/021,524

(22) Filed: Dec. 12, 2001

(65) Prior Publication Data

US 2002/0075527 A1 Jun. 20, 2002

(30) Foreign Application Priority Data

Dec. 15, 2000 (JP) .............................. 2000-382846

(51) Int. Cl.
G06K 15/00 (2006.01)

(52) U.S. Cl. ..................................... 358/1.12; 358/1.18
(58) Field of Classification Search ................ 358/474, 358/475, 486, 1.12, 1.18, 488, 496, 498
See application file for complete search history.

(56) References Cited

U.S. PATENT DOCUMENTS

| | | | | |
|---|---|---|---|---|
| 4,907,287 A | * | 3/1990 | Homma et al. | 382/255 |
| 4,975,787 A | * | 12/1990 | Ijuin et al. | 358/461 |
| 6,295,140 B1 | * | 9/2001 | Kameyama | 358/461 |
| 6,336,082 B1 | * | 1/2002 | Nguyen et al. | 702/179 |
| 6,750,990 B1 | * | 6/2004 | Ohashi | 358/496 |
| 6,792,161 B1 | * | 9/2004 | Imaizumi et al. | 382/275 |
| 6,937,361 B1 | * | 8/2005 | Kondo et al. | 358/1.9 |
| 2003/0043246 A1 | * | 3/2003 | Codos | 347/102 |
| 2003/0043256 A1 | * | 3/2003 | Conrow et al. | 347/248 |

FOREIGN PATENT DOCUMENTS

| | | | |
|---|---|---|---|
| JP | 356153479 | * | 11/1981 |
| JP | 5-068168 | | 3/1993 |
| JP | 407177314 | * | 7/1995 |
| JP | 408125811 A | * | 5/1996 |
| JP | 11011779 A | * | 1/1999 |
| JP | 2000-196814 | * | 7/2000 |
| JP | 2003-310820 | | 11/2000 |
| JP | 02002176542 | * | 6/2002 |
| JP | 02002250977 | * | 9/2002 |
| JP | 2003115980 | * | 4/2003 |

OTHER PUBLICATIONS

Office Action dated Jun. 24, 2003 of JP 2000-382846.

* cited by examiner

*Primary Examiner*—Jerome Grant, II
(74) *Attorney, Agent, or Firm*—Morgan & Finnegan, L.L.P.

(57) ABSTRACT

It is an object of this invention to provide highly reliable image read operation by detecting the positions of white and black streaks that can occur in flow scanning and prevent the occurrence of such streaks. To achieve this object, in copy operation, for example, the continuity and position of image data read by a CCD to detect the data as abnormal pixels, thereby outputting an image without any streak. In facsimile transmission, the continuity, position, and linewidth of image data are detected to detect the data as abnormal pixels, thereby transmitting an image without any streaks.

8 Claims, 31 Drawing Sheets

F I G. 14
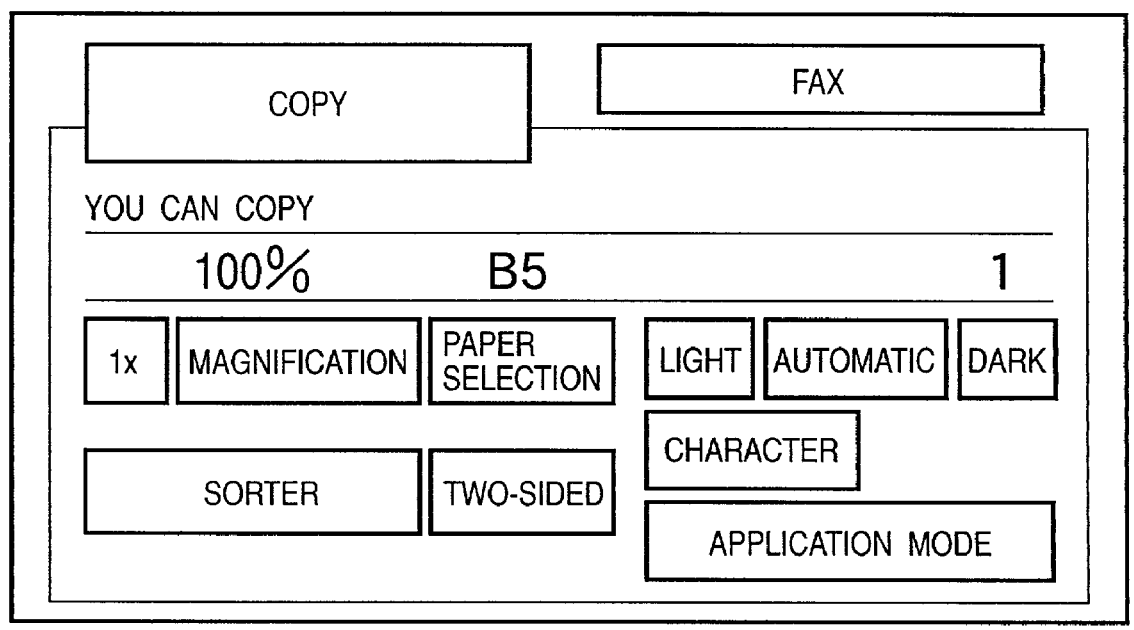

STREAK REMOVING IMAGE READING METHOD AND APPARATUS, PROGRAM, AND STORAGE MEDIUM

FIELD OF THE INVENTION

The present invention relates to an image reading method and apparatus, program, and storage medium and, more particularly, to so-called flow scanning, reading the data of an original image by moving the original image in image read operation.

BACKGROUND OF THE INVENTION

In a conventional facsimile, digital copying machine, or the like, to copy an original image at high speed, so-called flow scanning is performed. In this processing, original read operation is performed by sequentially feeding originals placed on the document feeder onto the original table, moving each original under the original table glass, and conveying it on the image reading unit in the ready state at a predetermined speed instead of moving the image reading unit relative to the originals placed on the original table.

An original is read by a CCD or the like. Recently, an original can be read as high-resolution data at a resolution as high as 600 pixels per inch.

Owing to the merit in handling images as digital data, one machine has a facsimile function and has a function of printing data from a personal computer or the like as well as a copy.

In flow scanning, however, since an original image moving on a predetermined position on the original table is read as high-resolution data, data in the form of black or white streaks, which are not present on the original, are formed on a copy sheet due to the influence of abnormal states such as minute dust, dirt, or flaws (a points A and B in FIG. 31).

In addition, in the facsimile transmission mode, data in the form of streaks are transmitted.

SUMMARY OF THE INVENTION

The present invention has been made in consideration of the above situation, and has as its object to provide an image reading method and apparatus which suppresses the occurrence of inconveniences in an image due to an abnormal state such as dust or flaw, e.g., a white/black streak, by limiting/controlling a function unique to each apparatus, e.g., a copying machine or facsimile, thereby obtaining an image free from such inconveniences.

In order to solve the above problem and achieve the above object, according to the first aspect of the present invention, there is provided an image reading apparatus characterized by having the following arrangement.

The apparatus comprises exposure means for exposing an original to light, original mount means which is located between the exposure means and the original and with which the original is brought into tight contact, original convey means for moving the original on the original mount means with respect to the exposure means, image reading means for reading image light obtained by exposure while moving the original by using the original convey means, and abnormality detection means for detecting an abnormal state on the original mount means from the image data read by the image reading means, and detecting a pixel corresponding to the abnormal state as an abnormal pixel, wherein a printing element function is limited in accordance with the position of the abnormal pixel detected by the abnormality detection means.

According to the second aspect of the present invention, there is provided an image reading apparatus characterized by having the following arrangement.

The apparatus comprises abnormality detection means for detecting an abnormal state at a portion through which original illumination light passes to detect a pixel corresponding to the abnormal state as an abnormal pixel, wherein in outputting the read image data, a predetermined function is limited in accordance with the position of the abnormal pixel detected by the abnormality detection means.

An image reading method according to the present invention is characterized by being configured as follows.

This method is a method of reading an original image by illuminating an original with light, in which an abnormal state at a portion through which original illumination light passes is detected, a pixel corresponding to the abnormal state is detected as an abnormal pixel, and a predetermined function is limited in accordance with the position of the detected abnormal pixel in outputting the read image data.

A program according to the present invention is characterized by being configured as follows.

This program causes a computer to execute the above image reading method.

A storage medium according to the present invention is characterized by being configured as follows.

This storage medium stores the above program as a computer-readable program.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 14 is a schematic view showing a window in copy operation;

DETAILED DESCRIPTION OF THE PREFERRED EMBODIMENTS

The preferred embodiments to which the present invention is applied will be described in detail below with reference to the accompanying drawings.

First Embodiment

In this embodiment, a digital copying machine will be described as an image reading apparatus.

Figure 1:
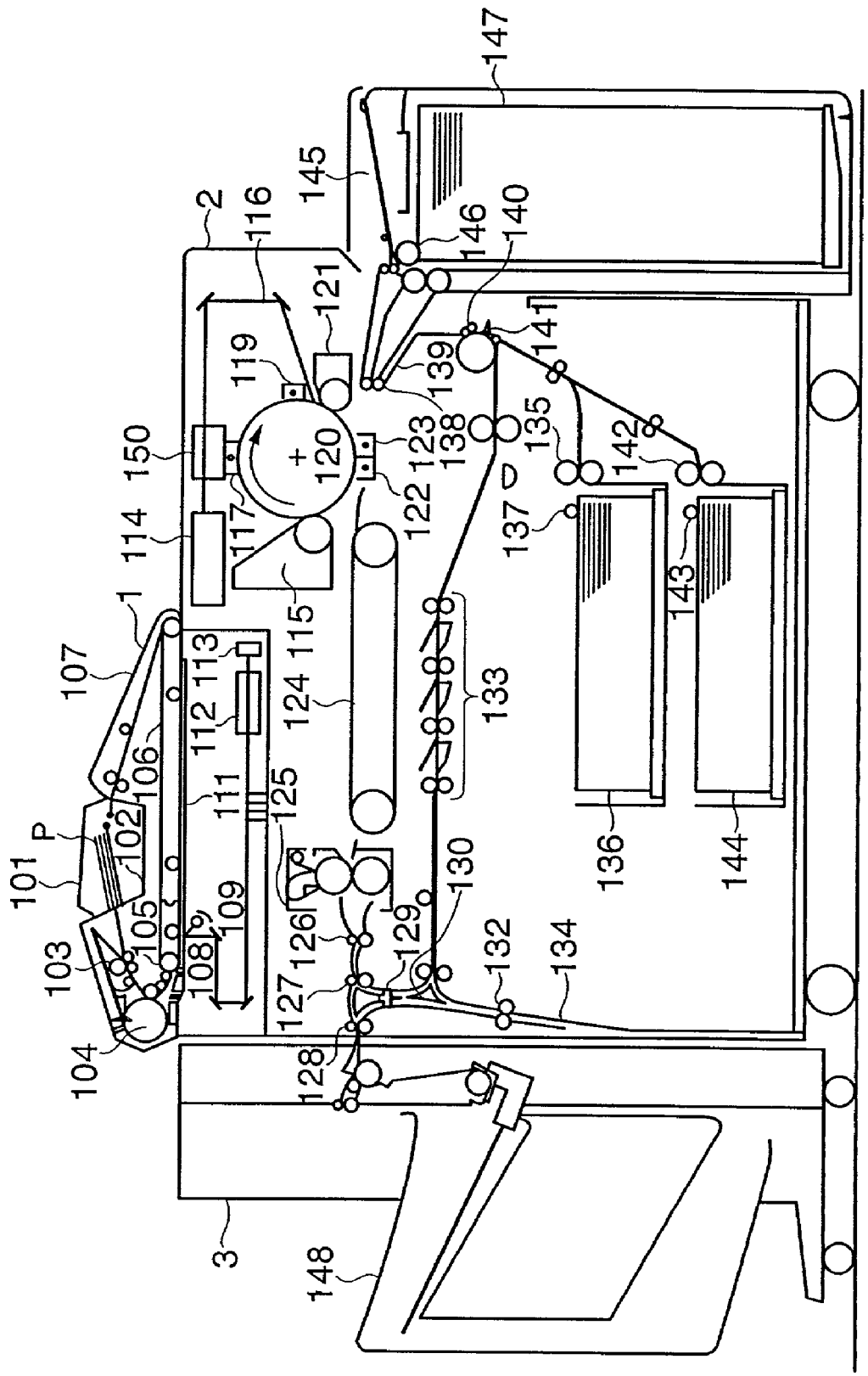
FIG. 1 is a sectional view showing the overall arrangement of a digital copying machine according to the first embodiment.

FIG. 1 is a sectional view showing the overall arrangement of a digital copying machine according to this embodiment. The arrangement and operation of a circulating document feeder (RDF) 1 serving as a sheet material convey unit for performing flow scanning of a sheet original P will be described below with reference to FIG. 1.

The RDF 1 serving as a sheet material convey unit has an original tray 102 placed on its upper part. A wide belt 106 wound around a drive roller 104 and turn roller 105 is placed on the lower part of the RDF 1. This wide belt 106 is in contact with the upper surface of a platen 111 of a copying machine main body 2 to convey the sheet original P placed on the original tray 102 onto a printing element position on the platen 111 or convey the sheet original P on the platen 111 to the original tray 102.

A pair of widthwise regulating plates 101 are arranged on the original tray 102 to be slidable in the width direction of the sheet original P and regulate sheets stacked on the original tray 102 in the width direction, thereby ensuring stability in feeding the sheet original P and alignment in conveying the sheet onto the original tray 102. When copy conditions are input with the operation portion of the copying machine, and the start key (not shown) is pressed, a path for a sheet original P is released, and a sheet original P is fed by a pickup roller. Each sheet original is separated by a separating unit 103 and moved to the downstream portion.

Original feed paths a and b are formed between the separating unit 103 and the platen 111. These original feed paths a and b are bent and connected to the convey path on the platen 111 to guide the sheet original P onto the platen 111. The sheet original P is then conveyed onto the original tray 102 through a second original feed path d formed on the right side of the RDF 1. At this time, processed and unprocessed sheet originals are discriminated from each other by a partition member (not shown) on the original tray 102.

Figure 2:
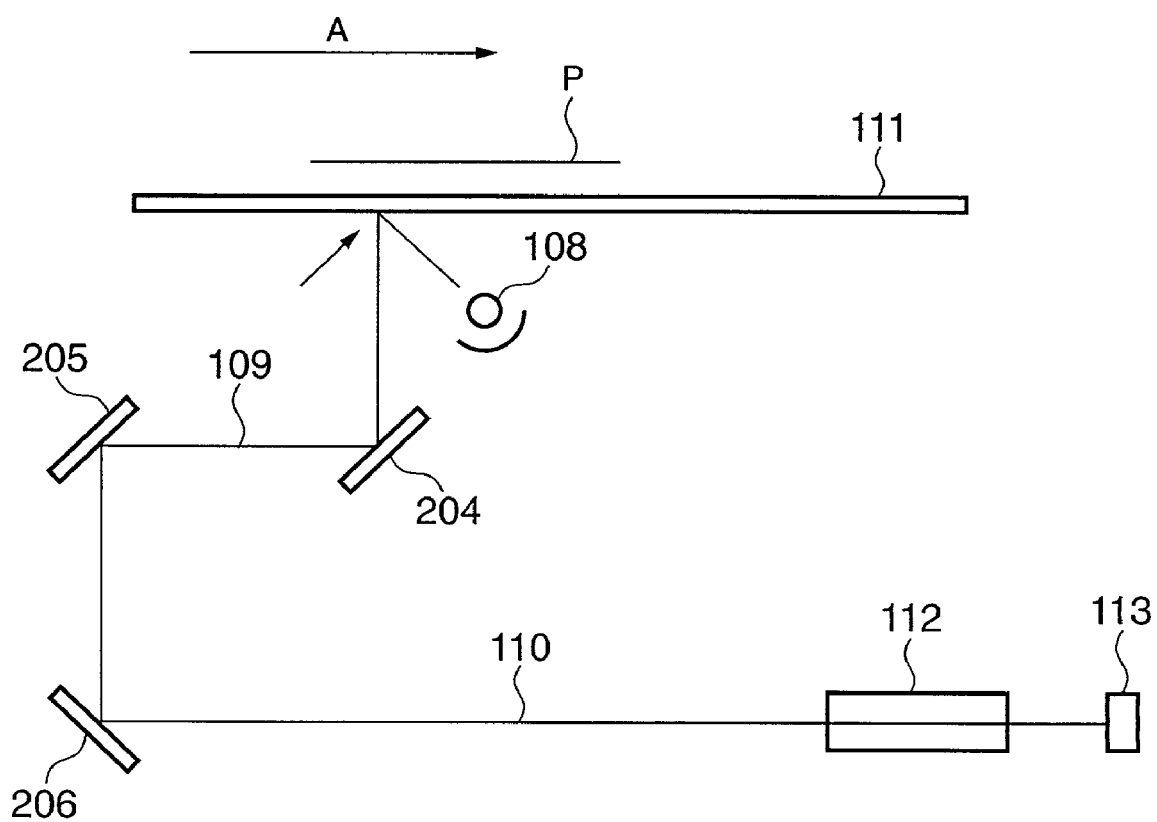
FIG. 2 is a view showing the detailed arrangement of the optical system of a digital copying machine according to the first embodiment.

FIG. 2 is a view showing the details of the optical system of the digital copying machine according to this embodiment.

The operation of the main body 2 will be described with reference to FIGS. 1 and 2. This main body 2 is an electrophotographic digital copying machine and roughly comprised of four blocks, namely a paper feed/convey system, exposure system, image-forming system, and control system, from the viewpoint of functions.

The exposure system is comprised of the platen 111, an original illumination lamp 108, optical path units 109 and 110, a zoom lens 112, a CCD unit 113, and the like. The sheet original P transferred to the platen 111 is illuminated by the original illumination lamp 108, and image data is input to the CCD unit 113 through a plurality of original optical image mirrors (204 to 211) and the zoom lens 112.

The image forming system is comprised of a photosensitive drum 120, primary charger 119, developing unit 121, drum cleaner unit 115, and the like.

The surface of the photosensitive drum 120 rotating clockwise with respect to the drawing surface is uniformly charged by the primary charger 119 and undergoes image exposure using light 116 emitted from a semiconductor laser 114. The latent image formed on the photosensitive drum 120 by the image exposure is developed by the developing unit 121. A transfer charger 123 then transfers the developed image onto a transfer paper sheet conveyed from a feed unit 136, 144, or 147.

After the transfer, the drum cleaner unit 115 removes residual toner from the photosensitive drum 120. A exposure lamp 117 removes residual charge from the photosensitive drum 120. The process of primary charging, image exposure, developing, and transfer is repeated again.

The paper feed/convey system is comprised of the feed units 136, 144, and 147, a convey unit 124, a fixing unit 125, and the like. In feeding a sheet from the upper cassette 136, a transfer paper sheet is fed from the cassette by a pickup roller 137 of the cassette 136 and conveyed to registration rollers 138 by a vertical path roller 141. In feeding a sheet from the lower cassette 144, a transfer paper sheet is fed from the cassette 144 by a pickup roller 143 and conveyed to the registration rollers 138 by the vertical path roller 141.

In manually feeding a sheet, a manually fed transfer paper sheet is conveyed to the registration rollers 138 by a manual pickup roller 146. The transfer paper sheet conveyed to the registration rollers 138 is brought into contact with the registration rollers 138 to form a loop, thereby eliminating sheet skews and performing timing correction for registration.

The transfer charger 123 transfers the toner image developed on the photosensitive drum 120 onto the transfer paper sheet transferred from the registration rollers 138. The transfer paper sheet is separated from the photosensitive drum 120 by a separation charger 122 and conveyed to the fixing unit 125 through the convey unit 124.

The fixing unit 125 is heated by a fixing heater (not shown). The surface temperature of the fixing unit 125 is detected by a thermister to be controlled to a predetermined value. The toner image transferred onto the transfer paper sheet is fixed on the transfer paper sheet conveyed to the fixing unit 125 with heat and pressure. After fixing, the fixing roller is cleaned by a web. The transfer paper sheet on which the toner image is fixed is conveyed outside the machine by discharge rollers 128 and stacked on a discharge tray 148.

Figure 3:
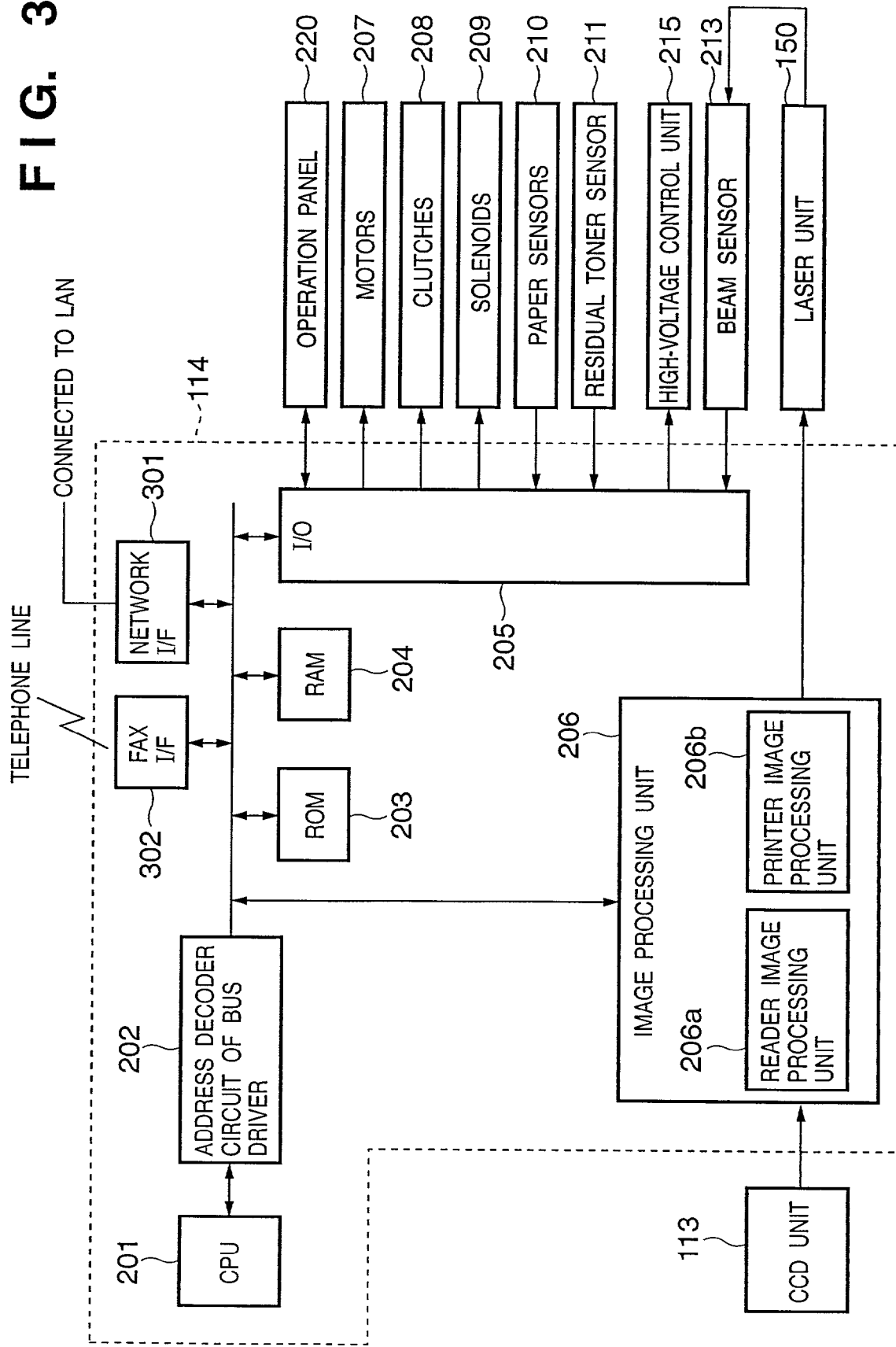
FIG. 3 is a block diagram showing a controller unit in the digital copying machine according to the first embodiment.

FIG. 3 is a block diagram of a controller unit 114 in the digital copying machine according to this embodiment.

Reference numeral 201 denotes a CPU for controlling the overall image processing apparatus. The CPU 201 sequentially reads out programs from a read-only memory (ROM) 203 storing control procedures (control programs) for the apparatus main body and executes them. The address and data buses of the CPU 201 are connected to the respective loads through a bus driver circuit/address decoder circuit 202, and also connected to a LAN through a network I/F unit 301. This makes it possible to print from a personal computer or the like. Likewise, the above buses are connected to a telephone line through a FAX I/F unit 302 to allow transmission/reception of facsimile images.

Reference numeral 204 denotes a random-access memory (RAM) serving as a main storage unit used to store input data or used as a work area or the like; and 205, an I/O interface connected to each load of the apparatus, e.g., an operation panel 220 for displaying the state of the apparatus or the like by using a liquid crystal device, LED, or the like upon key operation by the operator, motors 207, clutches 208, and solenoids 209 for driving the paper feed system, convey system, and optical system, and paper sensors 210 for detecting a conveyed paper sheet.

A developing unit 118 includes a residual toner sensor 211 for detecting the amount of toner in the developing unit. An output signal from the developing unit 118 is input to the I/O interface 205. Reference numeral 215 denotes a high-voltage unit for outputting high voltages to the primary charger 119, the developing unit 118, a pre-transfer charger 119, the transfer charger 123, and the separation charger 122 in accordance with instructions from the CPU.

Reference numeral 206 denotes an image processing unit which receives an image signal output from the CCD unit 113, performs image processing to be described later, and outputs a control signal for a laser unit 150 in accordance with image data. The photosensitive drum 120 is illuminated with the laser beam output from the laser unit 150 to perform exposure. In addition, in a non-image area, an emission state is detected by a beam sensor 213 serving as a photoreceiver, and the output signal from the sensor is input to the I/O interface 205.

Figure 4:
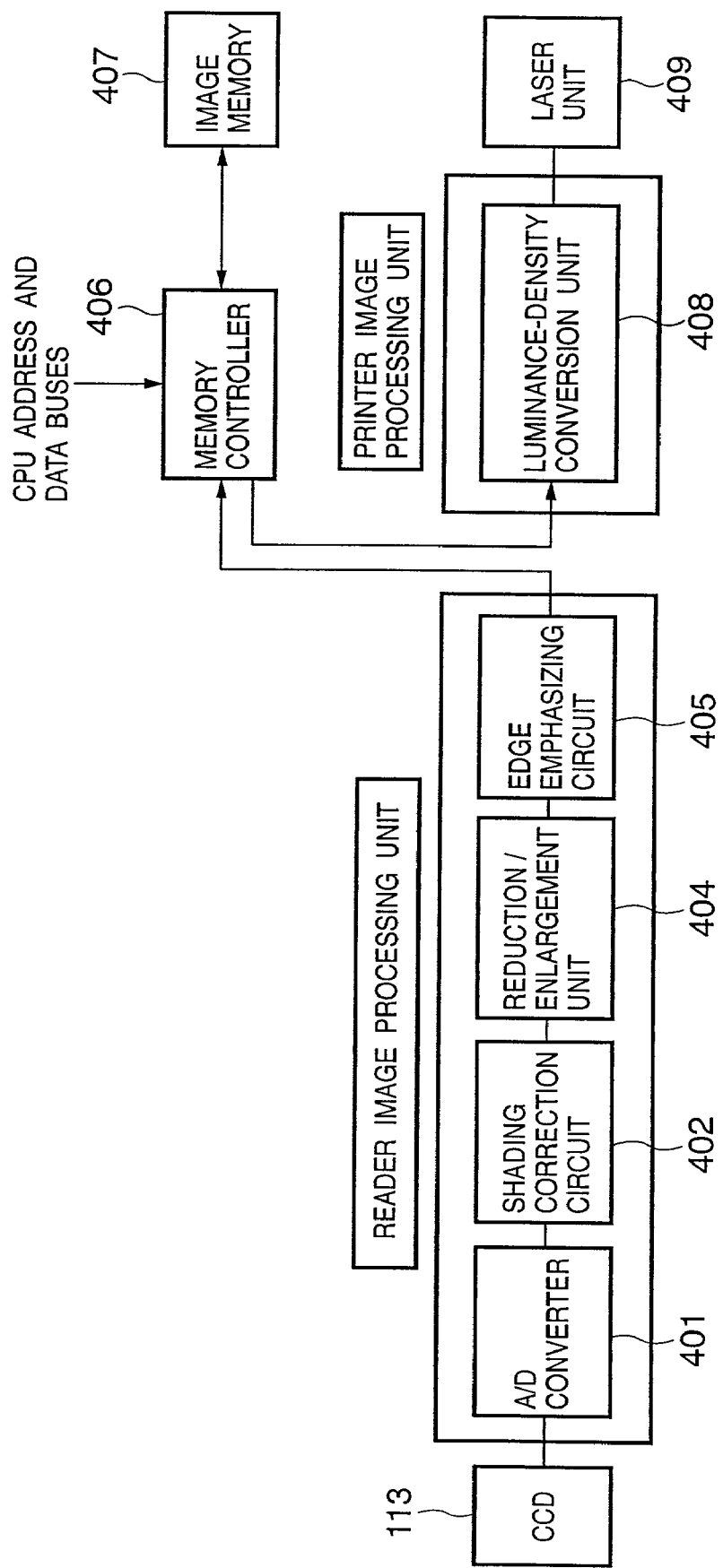
FIG. 4 is a block diagram showing an image processing unit in the controller unit in the image forming apparatus according to the first embodiment.

FIG. 4 is a block diagram showing the image processing unit 206 in the controller unit 114 in the image forming apparatus according to this embodiment.

First of all, 8-bit R, G, and B image signals converted into electrical signal by the CCD unit 113 are converted from analog signals to digital signals by an A/D converter 401. A shading correction circuit 402 then corrects variations among pixels.

Subsequently, the signals are input to a reduction/enlargement unit 404 to be subjected to image enlargement/reduction processing. In the reduction copy mode, data is thinned out. In the enlargement copy mode, data is interpolated. An edge emphasizing circuit 405 then calculates the second derivative of the data with, for example, a 5×5 window to emphasize the edge of the image.

The resultant data are stored in an image memory 407 such as a DRAM or hard disk. The memory controller 406 performs read/write control on the image memory 407. When an image is to be rotated, the memory controller 406 controls the read addresses of image data in the memory. The CPU address and data buses are connected to the memory controller 406. The CPU can read/write data from/on the image memory through the memory controller.

When the data stored in the image memory 407 is to be output to the printer, the memory controller 406 reads out the data from the memory and inputs it to a luminance-density conversion unit 408. This is because the data read by the CCD is luminance data and must be converted into density data when it is printed. Data conversion is performed by table search. After the data is converted into density data, the data is output to a laser unit 409. In the laser unit, the image data is converted into a signal representing the emission intensity of a laser, thereby performing image formation processing.

Figure 5:
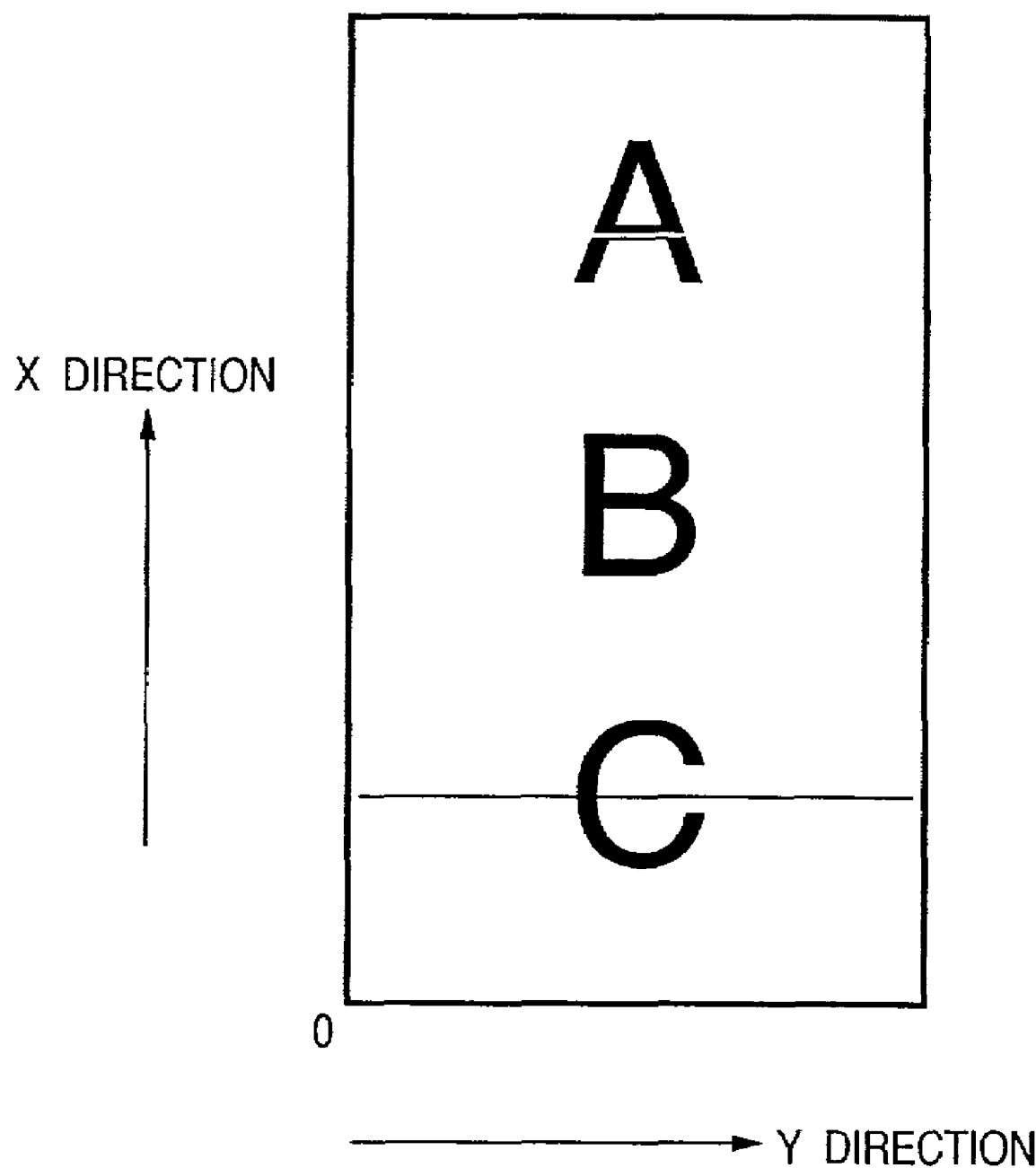
FIG. 5 is a schematic view showing image data stored in an image memory.

FIG. 5 is a schematic view showing image data stored in the image memory.

The image memory is configured to be accessed by one-dimensional consecutive addresses. In storing the image data read by the CCD in the image memory, the memory controller 406 performs control to store the data at addresses with values of 0, α, 2 x α, . . . in the memory for each read line, i.e., at an image transfer period (letting α be the width in the x direction). As this value α, a value larger than the number of pixels in the x direction is set. This makes it possible to handle the image data stored in the image memory as two-dimensional data in the x and y directions.

In the above manner, the CPU accesses the image data stored in the image memory 407 through the memory controller 406. When the CPU accesses data in the image memory 407, the memory controller switches the image data bus connected to the memory to the CPU bus. This allows the CPU to access the data in the memory and detect abnormal data in flow scanning.

Figure 6:
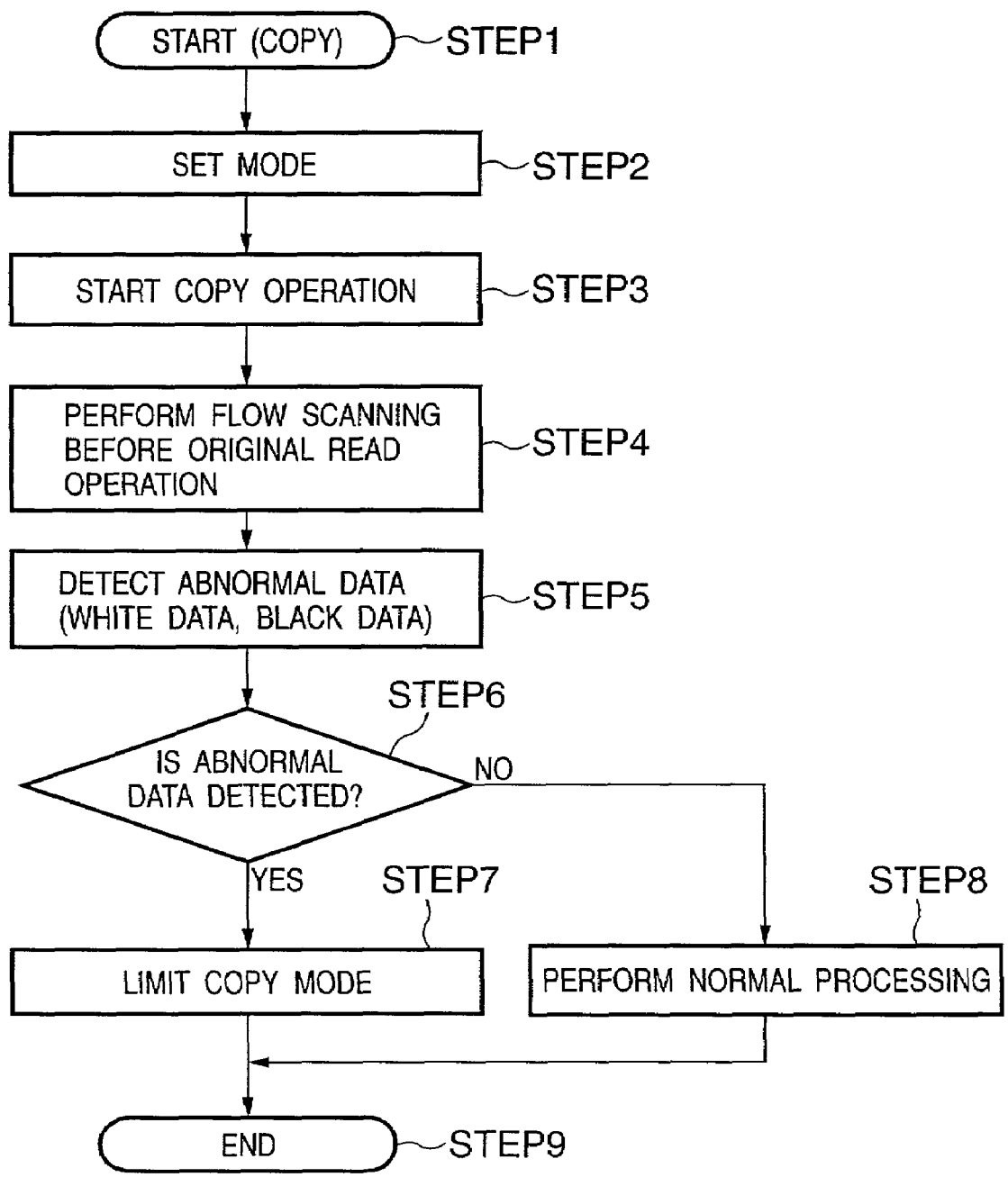
FIG. 6 is a flow chart showing determination of abnormal data in copy processing and processing after the determination.

FIG. 6 is a flow chart showing determination of abnormal data in copy processing and processing after the determination.

In copy processing, the user sets the copy mode with the operation portion (step 2). After setting, the user presses the copy key to start copy processing (step 3). Before the copy processing with sequentially feeding of originals, flow scanning of images is performed (step 4). The images are captured in the image memory 407 by flow scanning without moving the originals on the original table. It is checked whether there is any abnormal data in the captured images (step 5). If abnormal data is detected, a limitation is imposed on the copy mode (step 7). If no abnormal data is detected, normal copy processing is performed (step 8).

Figure 7:
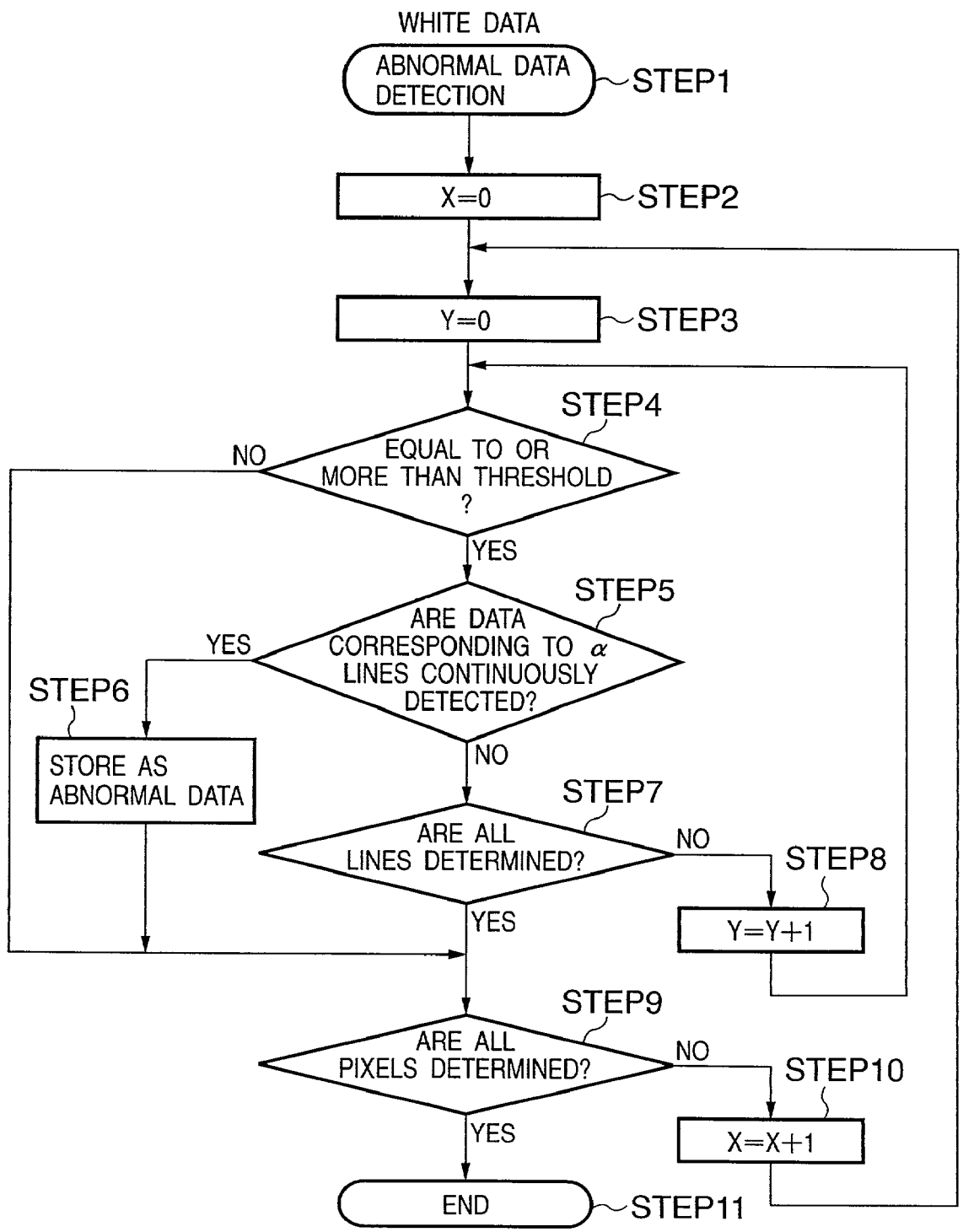
FIG. 7 is a flow chart showing the details of the flow of detection of image data read as a streak due to the influence of a flaw, dust, or the like on an original table glass in flow scanning.
Figure 8:
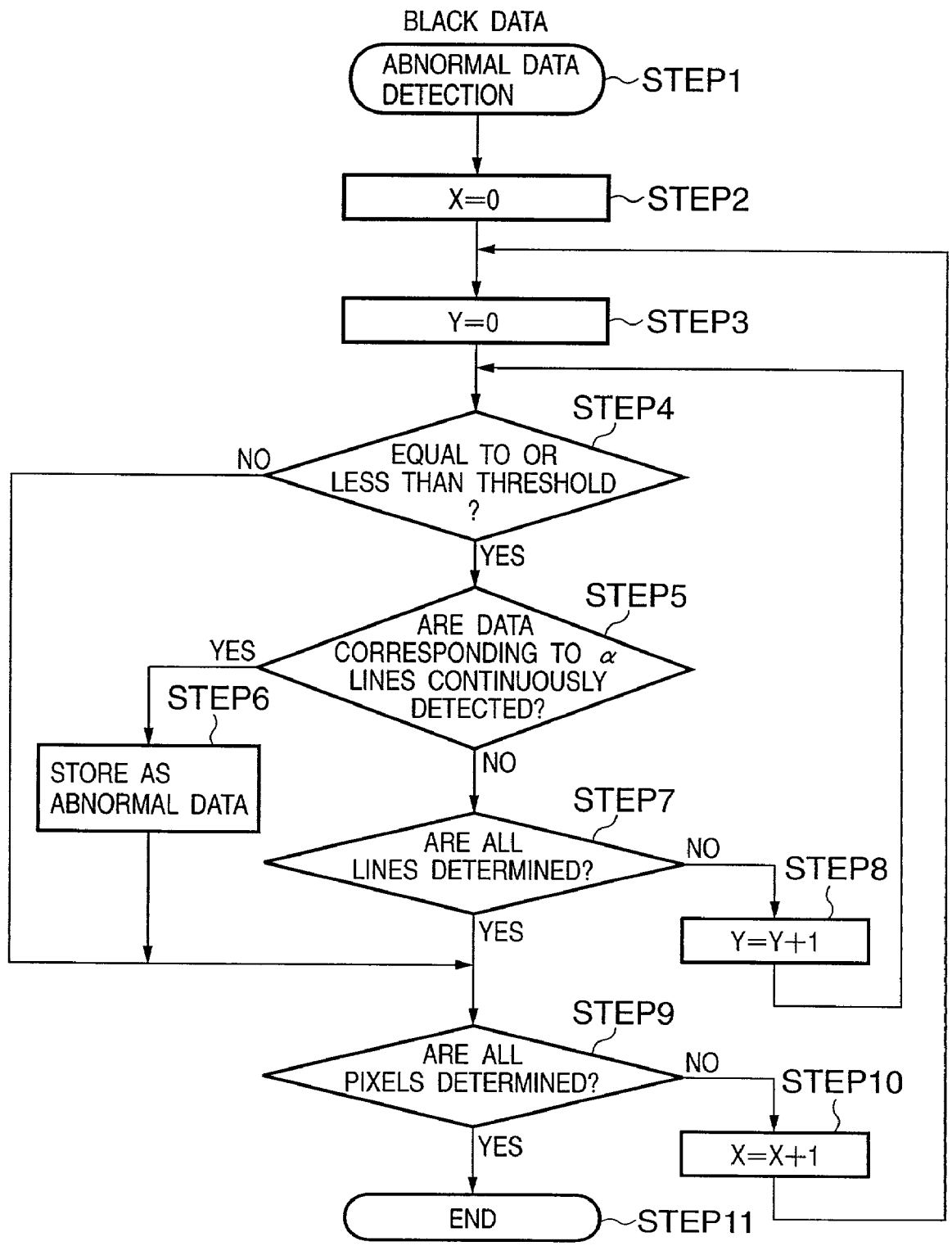
FIG. 8 is a flow chart showing the details of the flow of detection of image data read as a streak due to the influence of a flaw, dust, or the like on an original table glass in flow scanning.

FIGS. 7 and 8 are flow charts showing the flow of processing for detecting image data read as a streak due to the influence of a flaw, dust, or the like on the original table in flow scanning.

Detection of abnormal data includes detection of white data output as a white streak on an output paper sheet and detection of black data output as a black streak.

The flow of processing for the detection of abnormal white data will be described with reference to FIG. 7.

Referring to FIG. 7, first of all, the value of an x-coordinate is initialized to 0 (step 2), and the value of a y-coordinate is initialized to 0 (step 3). If this data is larger than a predetermined threshold, it is determined that the data may be abnormal data (step 4), and the flow advances to step 5. In step 5, continuation of data equal to or larger than the threshold is detected. If the continuation of data equal to or larger than the threshold is smaller than a lines, the flow advances to step 7. This determination is repeated for all the lines in the y direction (steps 7 and 8) If data equal to or larger than the threshold are continuously detected throughout a lines (step 5), the corresponding pixels are stored as abnormal data in the memory (step 6). In this manner, determination is performed for all the pixels in the x direction (steps 9 and 10).

The flow of processing for the detection of abnormal black data will be described below with reference to FIG. 8. In this case, processing almost the same as that described with reference to FIG. 7 is performed. This processing differs from the processing in FIG. 7 in comparison with the threshold in step 4.

In this flow, it is checked whether read data is equal to or less than the threshold. This makes it possible to detect black streak data which is not produced in normal operation.

Since other processing is the same as that in FIG. 7, a description thereof will be omitted.

Figure 9:
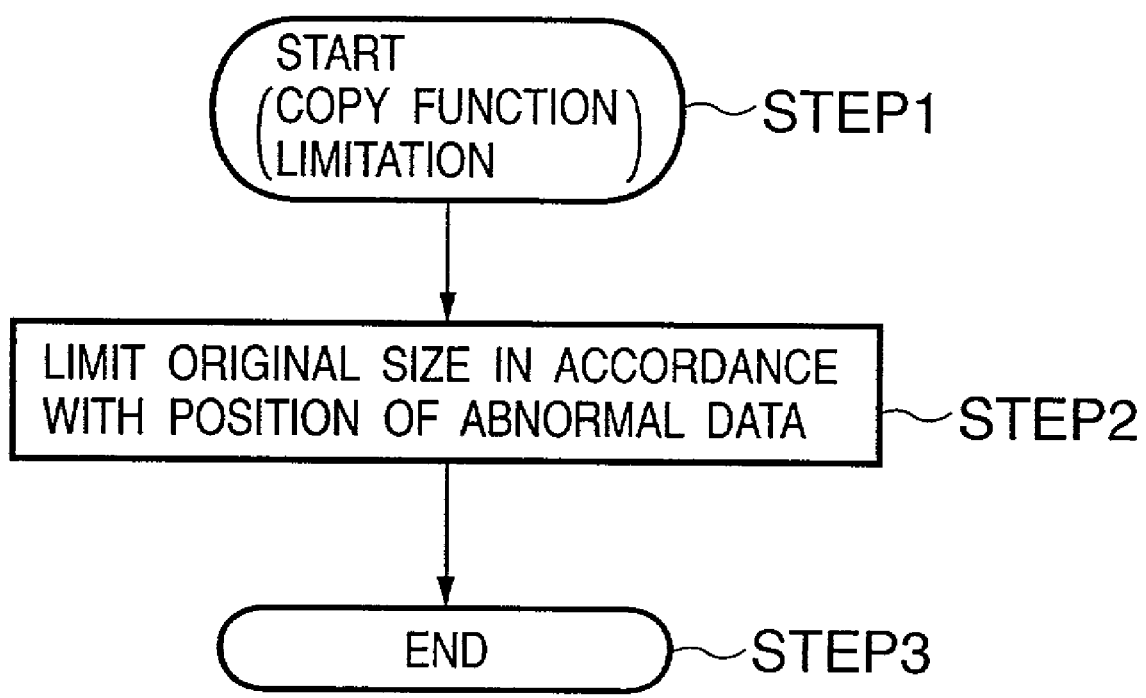
FIG. 9 is a flow chart showing copy mode limitation processing in step 7 in FIG. 6.

FIG. 9 is a flow chart showing copy mode limitation processing in step 7 in FIG. 6.

In copy mode limitation, limitations are imposed on original size and paper sheet size in accordance with the position of the abnormal data detected in step 6 in FIG. 6.

Figure 10:
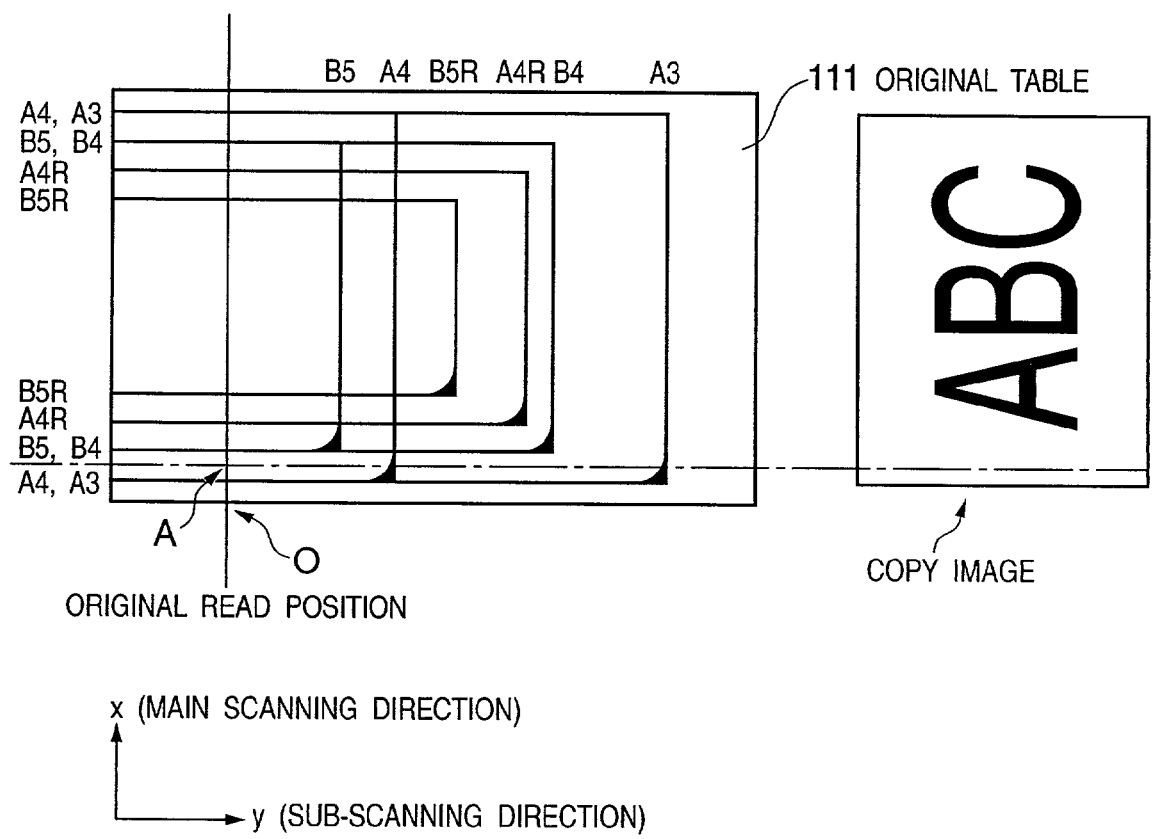
FIG. 10 is a schematic view showing the relationship between the original table and the read position of an original.

This processing will be described in more detail below with reference to FIG. 10. FIG. 10 is a schematic view showing the relationship between the original table 111 and the read position of an original.

Obviously, as the size of an original increases, the original read position on the original table 111 increases. Referring to FIG. 10, an original is aligned with the left end of the original table 111 for the sake of descriptive convenience. In this case, since flow scanning is performed, the size in the main scanning direction at the original read position is important, but the size in the sub-scanning direction can be neglected. More specifically, in flow scanning, the main scanning size remains the same regardless of whether the original size is A4 or A3, although the sub-scanning size changes. Therefore, these originals can be handled in the same manner in terms of copy mode limitation processing.

Copy mode limitation processing is performed in accordance with the position of detected abnormal data in the main scanning direction (X direction).

Data to be stored in the image memory 407 for determination of abnormal data has a main scanning size corresponding to the width of the original table 111, and a sub-scanning size corresponding to the length of an A3 sheet. The origin in the main scanning direction is located at the 0 point in FIG. 10.

If the width of the original table 111 in the main scanning direction is 306 mm, an original image is conveyed from the feeder with reference to the middle point in the main scanning direction. As shown in FIG. 10, therefore, read positions can be indicated in accordance with the sizes of originals.

Assume that it is determined from the data in the image memory 407 that something that causes a black streak exists on a portion A in FIG. 10. Obviously, this position falls within the read portions of A4 and A3 originals but falls outside the read portion of a B4 original. If abnormal data is detected and the position of the abnormal data is also detected, the original size is limited in accordance with the position of the abnormal data in this embodiment.

Figure 11:
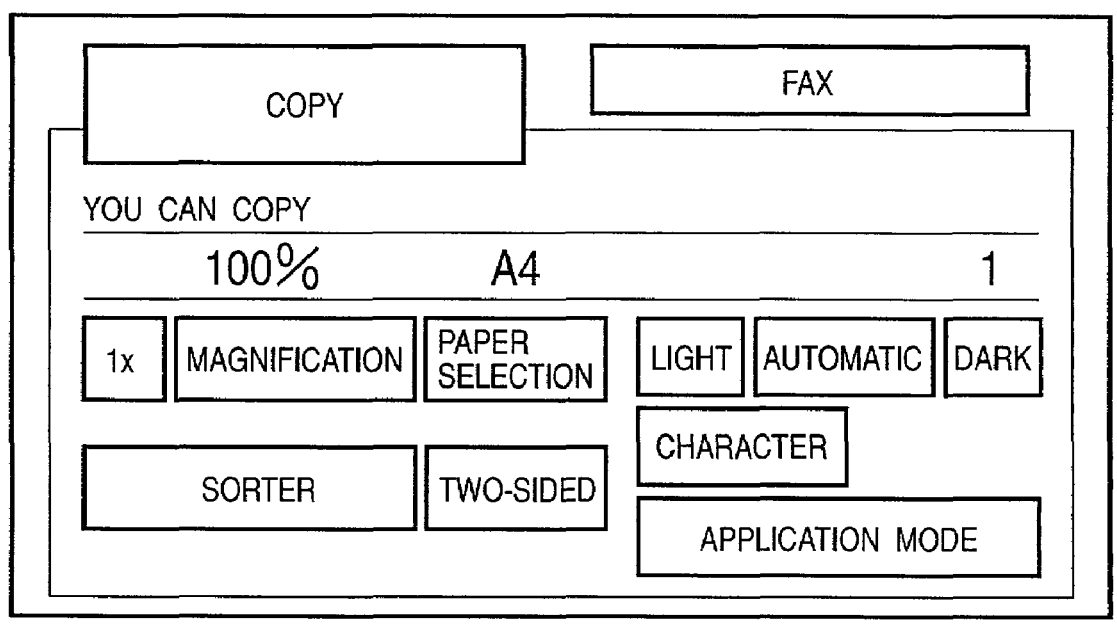
FIG. 11 is a schematic view showing a standard window in copy operation in the first embodiment.

FIG. 11 is a schematic view showing a standard window in copy operation in this embodiment.

Figure 12:
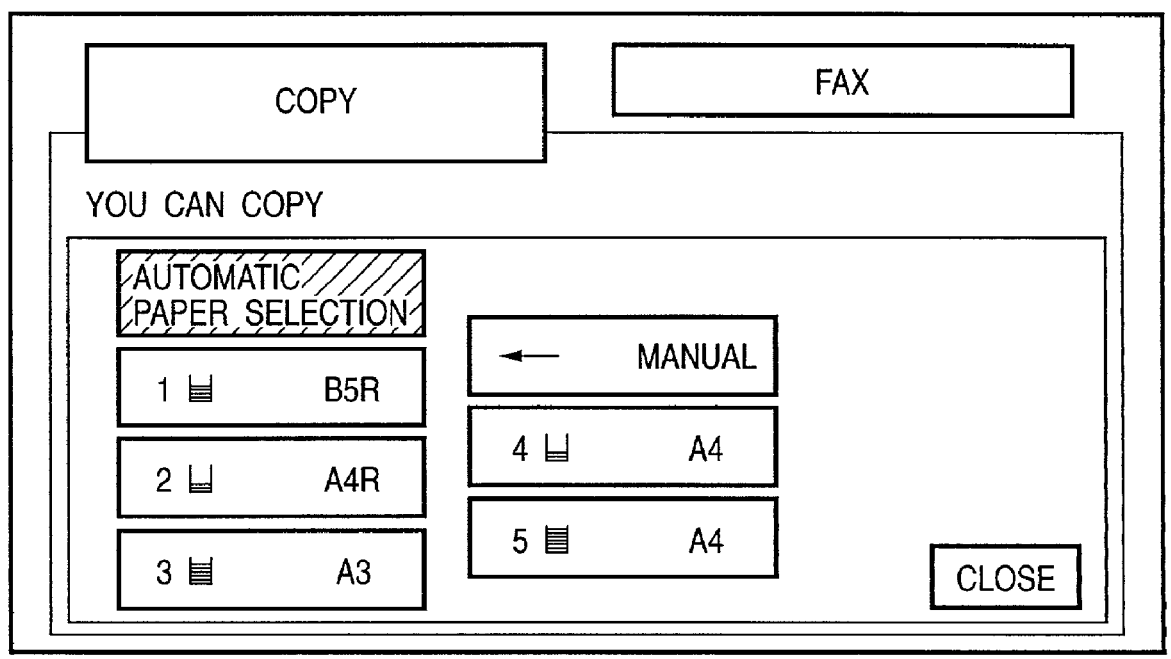
FIG. 12 is a schematic view showing a window displayed when paper selection is performed.

FIG. 12 is a schematic view showing a window to be displayed when paper selection is made. This window is displayed when the paper selection key on the standard window is pressed.

This window indicates first to fifth paper cassettes and the sizes and numbers of paper sheets set in the respective cassettes. The words "AUTOMATIC PAPER SELECTION" are displayed in white against the black background. This indicates that a paper sheet is automatically selected in accordance with the size of an original.

Figure 13:
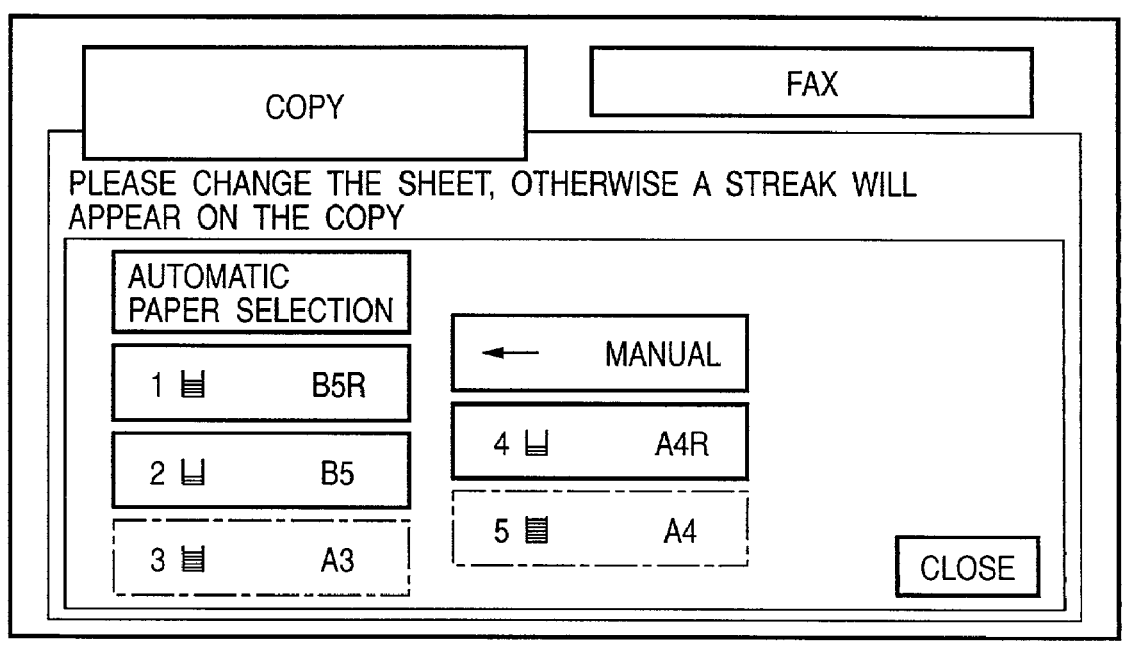
FIG. 13 is a schematic view showing a window displayed in copy operation.

In this case, since the abnormal data is detected on the portion A in FIG. 10, the window in FIG. 13 is displayed in copy operation. In this case, the message "Please change the sheet, otherwise a streak will appear on the copy" is displayed, and the selection of an A3-size paper sheet stored in the third cassette and an A4-size paper sheet stored in the fifth cassette is inhibited.

If the user selects a fourth cassette B5, the operation portion is changed to the one shown in FIG. 14, and copy operation is performed.

As described above, in this embodiment, when a white/black streak produced in flow scanning is detected, the apparatus can copy by limiting the paper size in accordance with the position of the white/black streak image instead of inhibiting the copy operation itself.

In this embodiment, only one-to-one copy operation has been taken as an example. However, in enlargement processing, output paper to be used must be limited in accordance with the relationship between the enlargement ratio and the effective position of the image to be read.

In reduction processing, output paper to be used must be limited in accordance with the relationship between the reduction ratio and the effective position of the image to be read.

More preferably, if an original size becomes larger than a paper sheet size in on-to-one copy operation or the like due to a limitation based on a white/black streak, a message indicating that some image portion will be omitted is displayed on the operation portion.

A digital copying machine or the like can easily rotate an image. Even if, therefore, an A4 original image is inhibited from being output onto an A4 paper sheet, it is preferable to display a message indicating that an A4R original image can be output onto an A4 paper sheet.

Second Embodiment

The second embodiment of the present invention will be described with reference to FIGS. 15 to 19.

In this embodiment, function limitation at the occurrence of a white/black streak in the facsimile transmission mode will be described.

Figure 15:
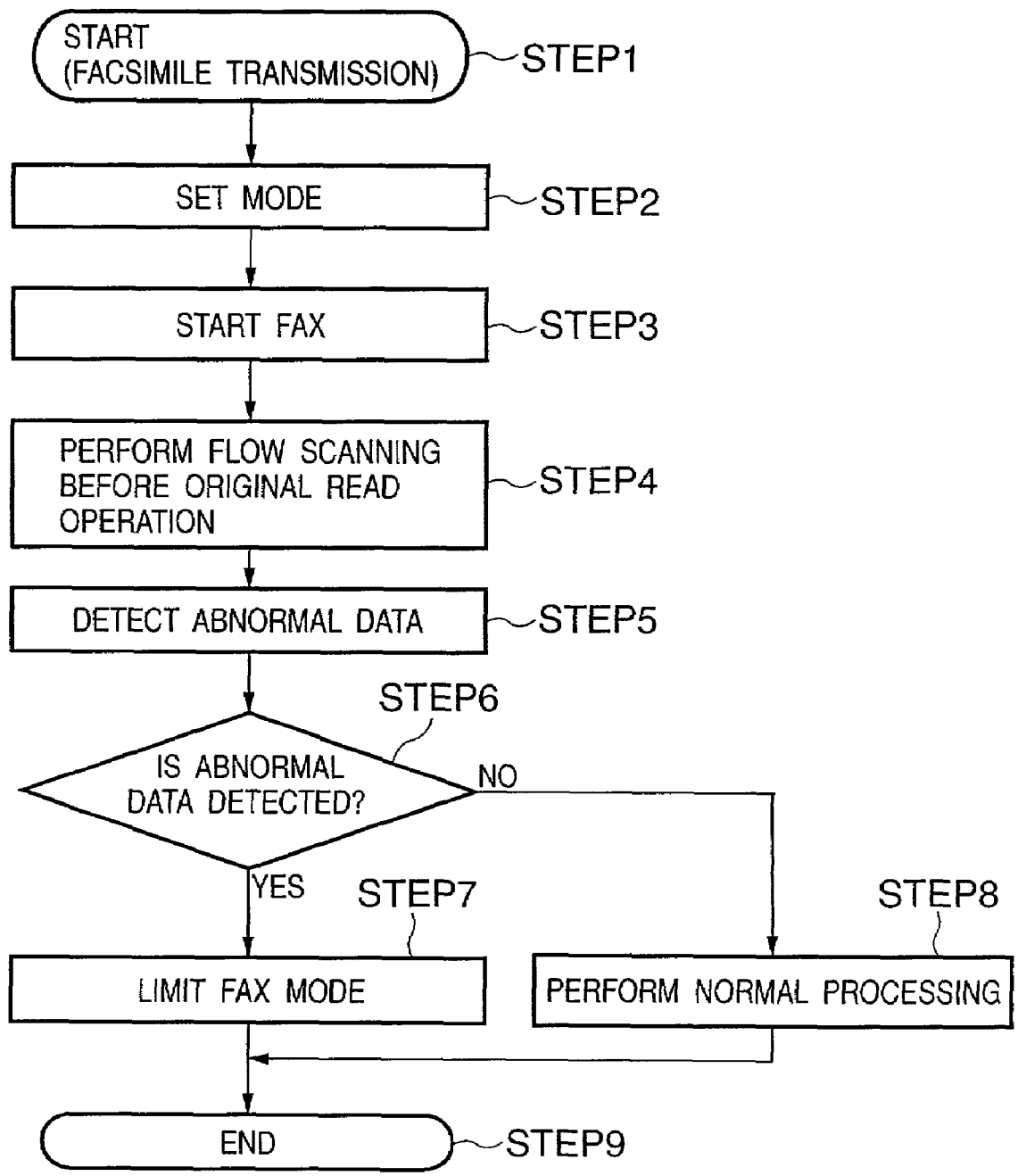
FIG. 15 is a flow chart showing determination of abnormal data in facsimile transmission and processing after the determination.

FIG. 15 is a flow chart showing determination of abnormal data in facsimile transmission and processing after the determination.

This flow chart is almost the same as that of FIG. 6. In facsimile transmission processing, the user sets the facsimile mode with the operation portion (step S2). Subsequently, transmission is started (step 3), flow scanning is performed (step 4), and abnormal data is detected (step 5). When abnormal data is detected (step 6), FAX mode limitation processing is performed (step 7).

Figure 16:
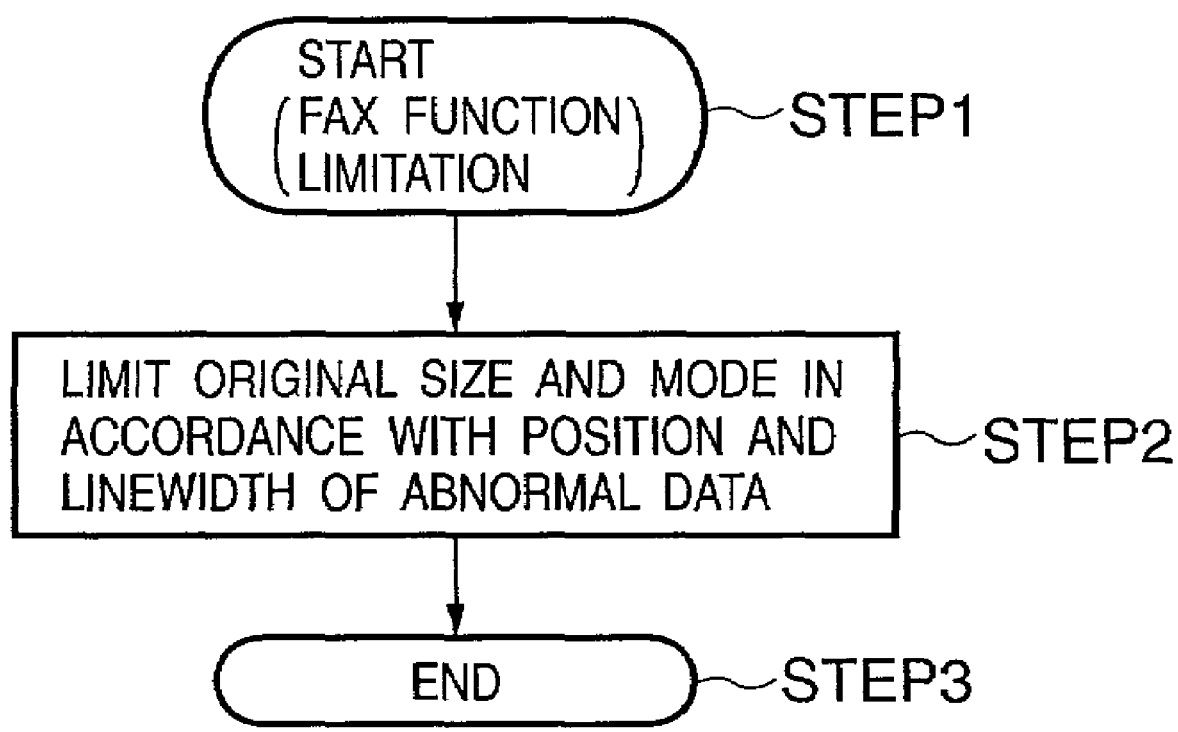
FIG. 16 is a flow chart showing FAX mode limitation processing.

FIG. 16 is a flow chart showing FAX mode limitation processing.

When the FAX mode limitation flow starts, limitations are imposed on the size of an original and the transmission mode in accordance with the position and linewidth of abnormal data (step 2).

In general, in the facsimile, a transmission mode can be selected. More specifically, the user selects densities in the main scanning direction and sub-scanning direction in accordance with the information amount of an original, a transmission time, and the like. For example, such transmission modes include:

standard: 8 dots/mm×3.85 lines/mm
fine mode: 8 dots/mm×7.7 lines/mm
superfine mode: 8 dots/mm×15.4 lines/mm
ultrafine mode: 16 dots/mm×15.4 lines/mm The image reading unit in this embodiment can read an image at 600 dots per inch. According to the same indication as that of the above unit, this unit can be expressed as 23.6 dots/mm×23.6 lines/mm. In the FAX transmission mode, therefore, data is always reduced and transmitted.

When data is to be transmitted in the standard mode, since the data is read at 23.6 dots/mm and transmitted at 8 dots/mm, data corresponding to 15.6 dots must be discharged per mm.

In general, this reduction processing is performed by the reduction/enlargement unit 404 in FIG. 4. However, the CPU 201 can perform such reduction processing for the image data in the image memory 407. This processing may be performed for continuous data in the main scanning direction by alternately deleting 15.6 dots and leaving the next 8 dots. Obviously, dots at decimal points cannot be handled, and hence a combination of 16 dots and 15 dots is deleted to delete 15.6 dotes on average.

Assume that a black/white streak as abnormal data is detected. In this case, if the linewidth of the streak is smaller than the linewidth (15 dots) for deletion, this streak can be neglected as an image.

In the ultrafine mode, since 7.6-dot data must be discarded, data less than 7 dots can be neglected.

Assume that when abnormal data in the image memory is to be deleted, the data extends over a portion to be left and a portion to be deleted. Even in this case, no problem arises if the data is temporarily deleted first, and then the corresponding portion is left afterward. When, however, the linewidth of abnormal data is larger than 15 dots in any mode other than the ultrafine mode or larger than 7 dots in the ultrafine mode, a streak is formed on an image even if the above method is used.

Assume that when the user tries to transmit data in the ultrafine mode, a streak with a linewidth of 10 dots is detected. In this case, the streak can be deleted and the data can be transmitted by changing the resolution. Therefore, the following processing is performed.

Figure 17:
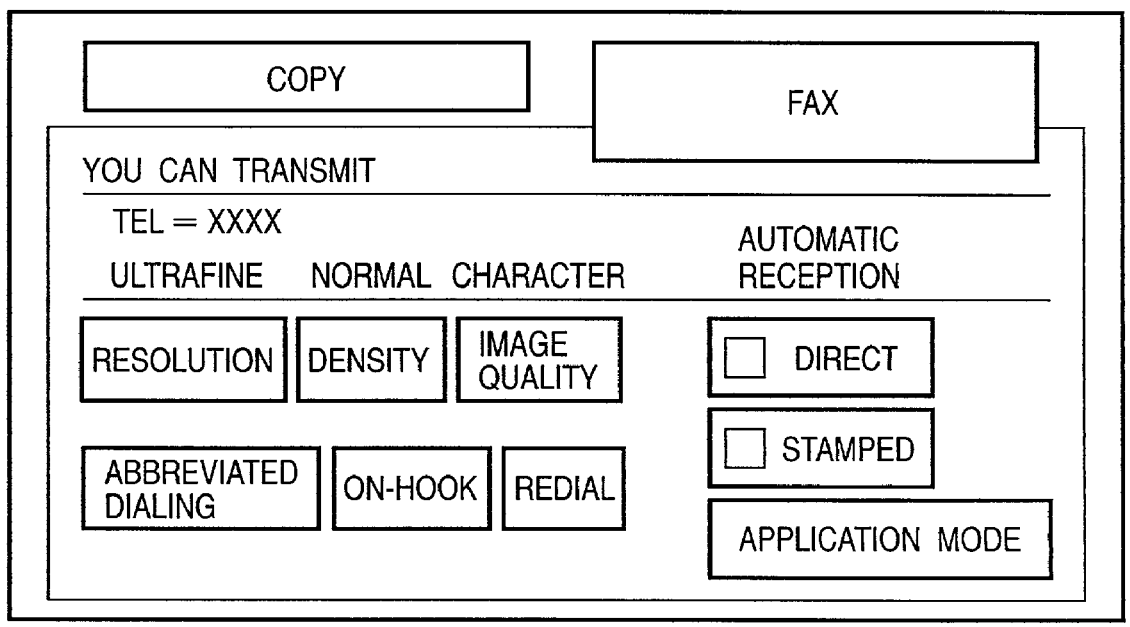
FIG. 17 is a schematic view showing a standard window for facsimile transmission set in the ultrafine mode.
Figure 18:
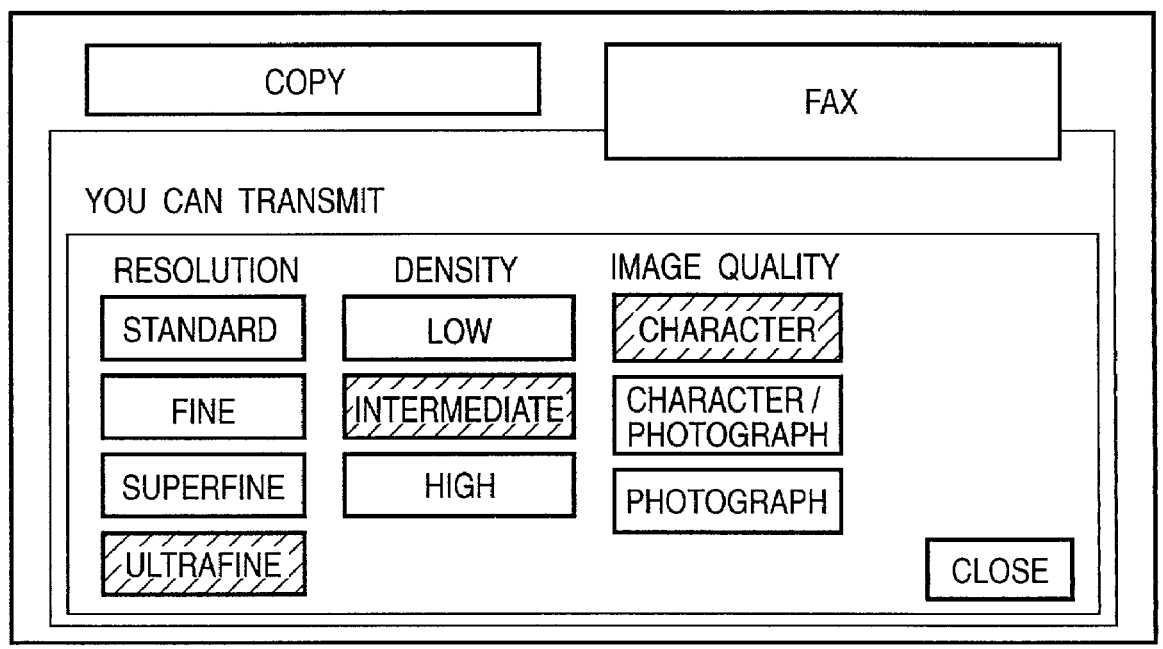
FIG. 18 is a schematic view showing a window for setting a resolution, density, and image quality.

FIG. 17 is a schematic view showing a standard window for the facsimile set in the ultrafine mode. FIG. 18 is a schematic view showing a window for setting a resolution, density, and image quality.

Figure 19:
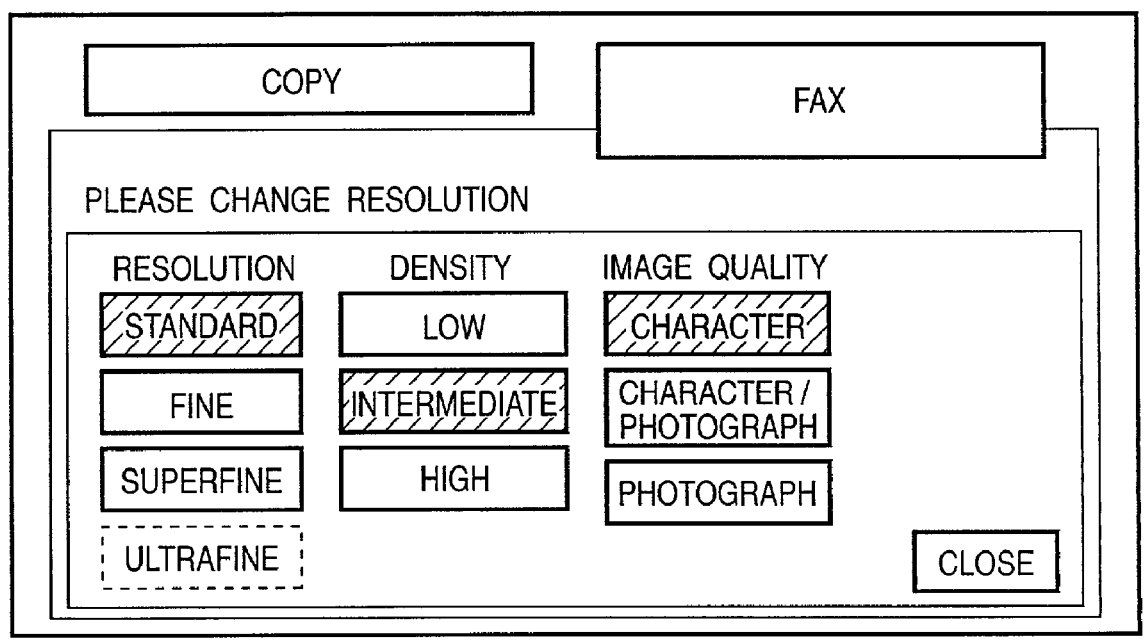
FIG. 19 is a schematic view showing a standard window for facsimile transmission which requests a change in setting to the standard mode.

To prompt the user to change the resolution, the window shown in FIG. 19 is displayed with the message "Please change resolution", and selection of the "ultrafine" key is inhibited. When the user selects another mode, facsimile transmission is performed.

Assume that the linewidth of abnormal data is larger than 15 dots. In this case, even if the resolution is changed, the occurrence of a streak cannot be avoided. For this reason, as in the first embodiment, the original size is limited in accordance with the occurrence position of the streak. That is, the effective original read position is limited.

In this manner, in facsimile transmission, a read position is determined in flow scanning, and actual read operation is performed. This operation is the same as that in the first embodiment described above, and hence a description thereof will be omitted.

Third Embodiment

Figure 20:
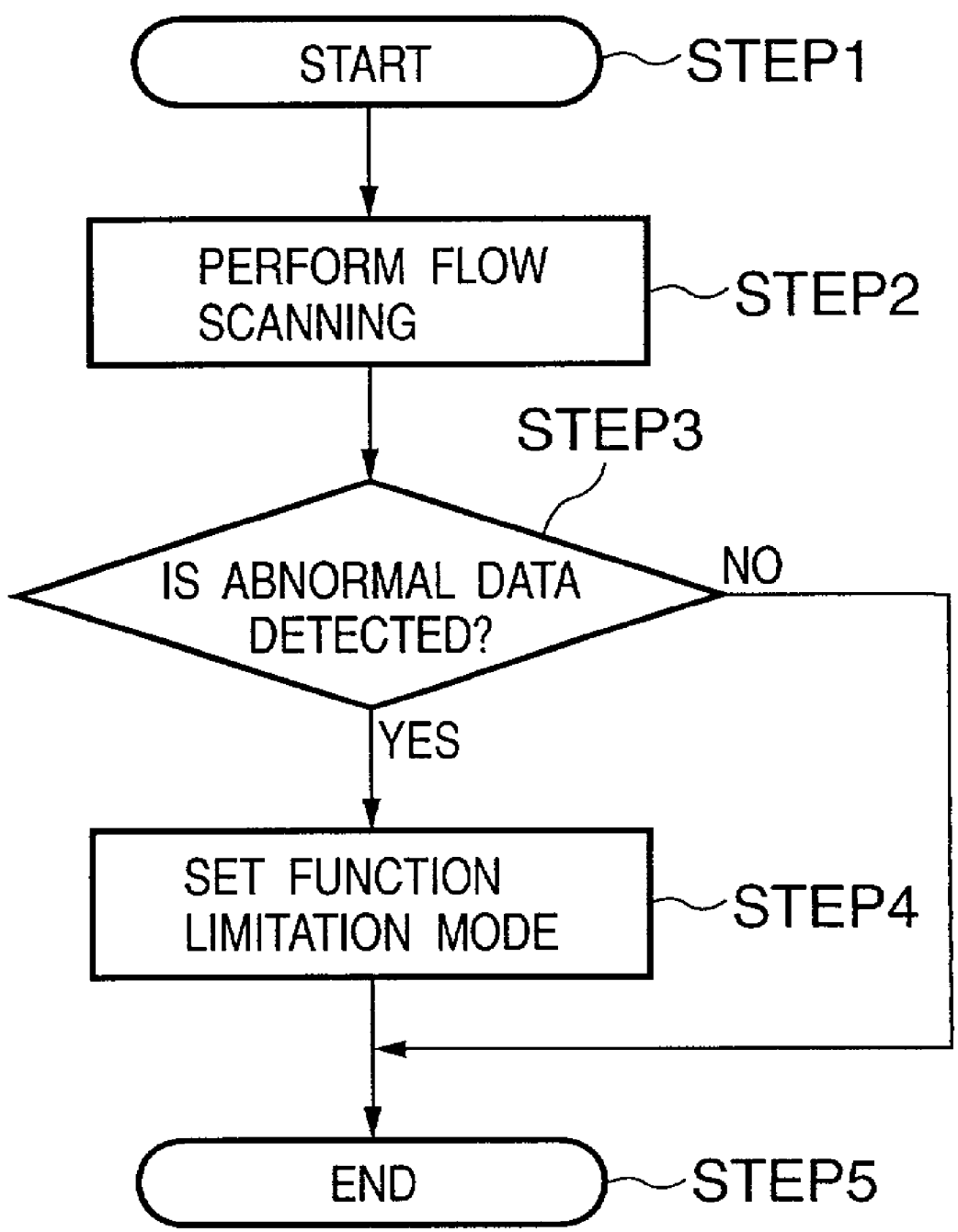
FIG. 20 is a flow chart showing processing for flow scanning in the third embodiment.

FIG. 20 is a flow chart showing processing for flow scanning in the third embodiment.

First of all, as shown in FIG. 4, flow scanning of an image is performed to capture the image in an image memory 407. This operation may be performed by actually reading the original image placed on a feeder 1 or performing flow scanning without moving the original on the original table (step 2). If abnormal data is detected upon checking the image in the image memory 407 afterward (step 3), the normal mode is switched to the function limitation mode (step 4). If no abnormal data is detected, the processing is terminated without switching the normal mode (step 5).

Figure 21:
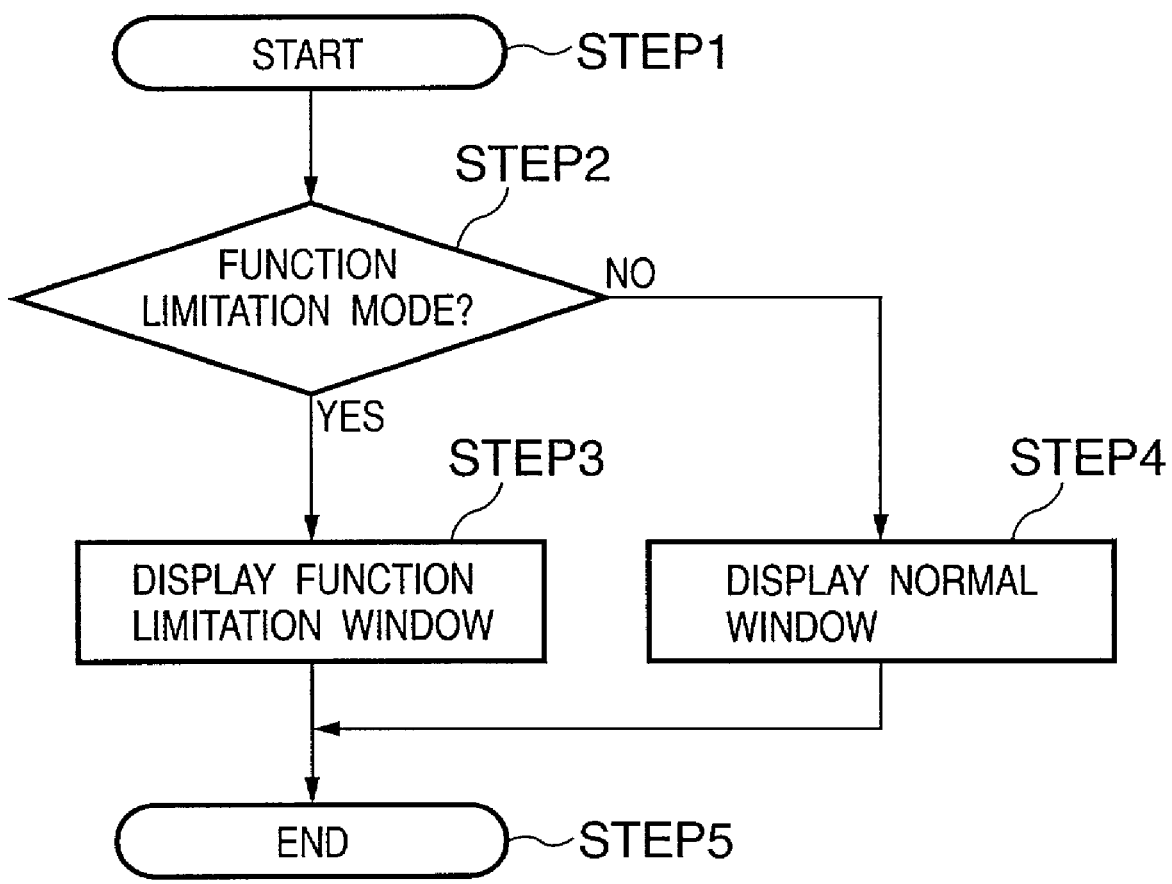
FIG. 21 is a flow chart showing processing performed on an operation portion in the third embodiment.

FIG. 21 is a flow chart showing processing performed by the operation portion in the third embodiment.

First of all, it is checked in step 2 whether the function limitation mode determined by the abnormal data detection flow in FIG. 20 is set.

If the function limitation mode is set, the function limitation window is displayed (step 3). If the function limitation mode is not set, the normal window is displayed on the operation portion (step 4).

Each of FIGS. 22 to 25 shows an example of the display on the operation portion.

Figure 22:
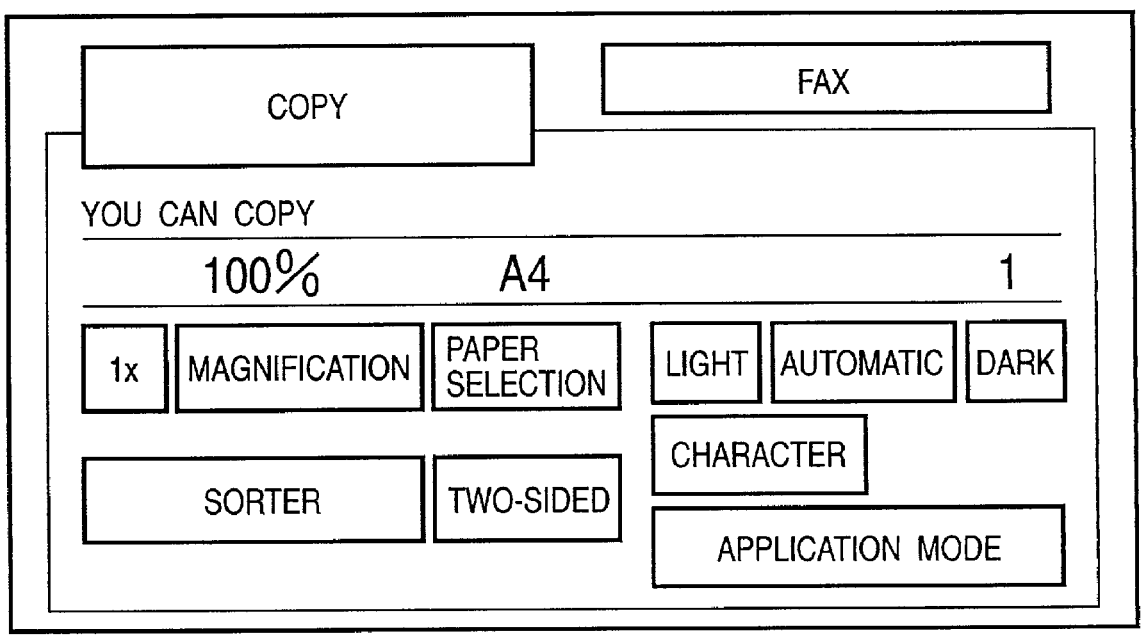
FIG. 22 is a schematic view showing a normal copy mode setting window.
Figure 23:
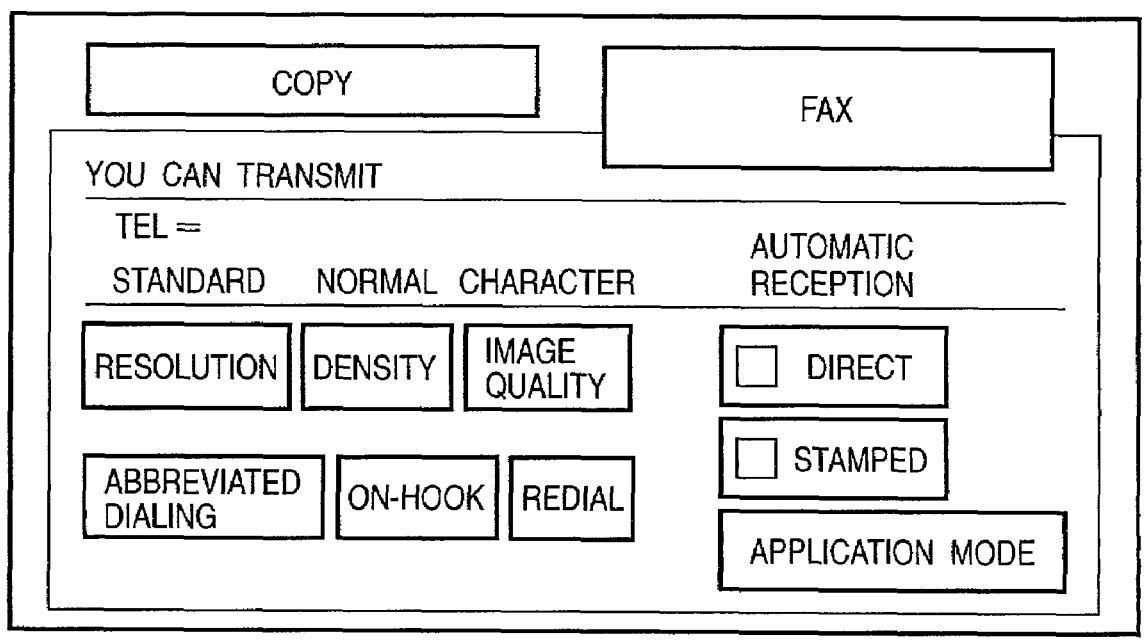
FIG. 23 is a schematic view showing a normal facsimile transmission window.

FIGS. 22 and 23 are schematic views respectively showing a normal copy mode setting window and facsimile transmission window.

Figure 24:
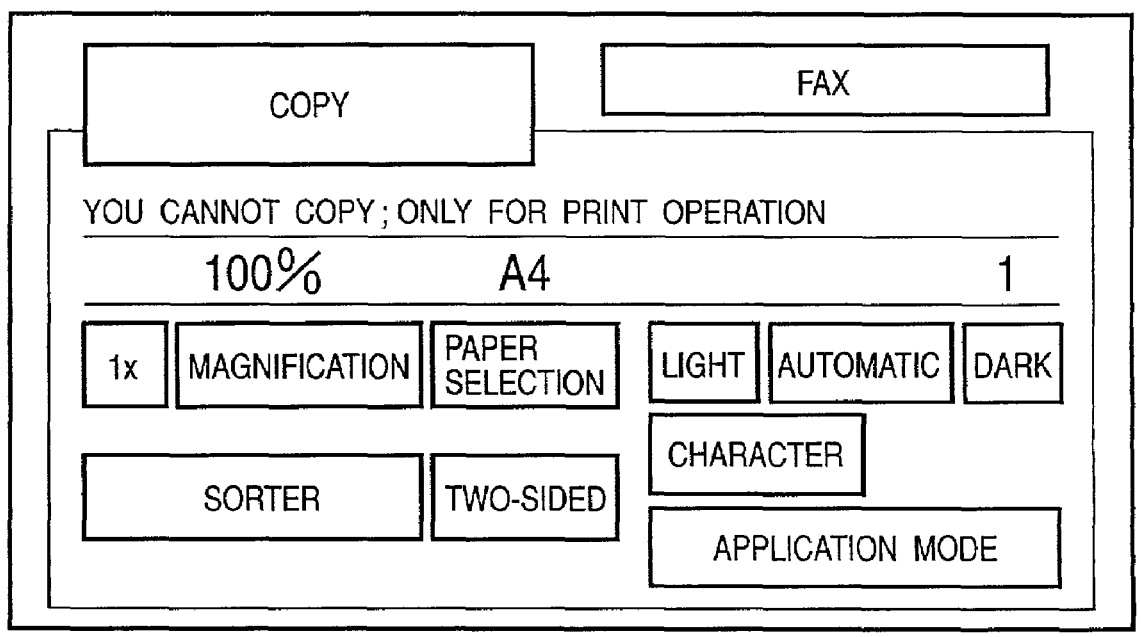
FIG. 24 is a schematic view showing a window displayed when a function limitation mode is set in FIG. 22.

When the function limitation mode is set, the display in FIG. 22 is changed to the shown in FIG. 24. That is, a window is displayed, which indicates that original read operation is inhibited, and the print function based on a network is permitted.

Figure 25:
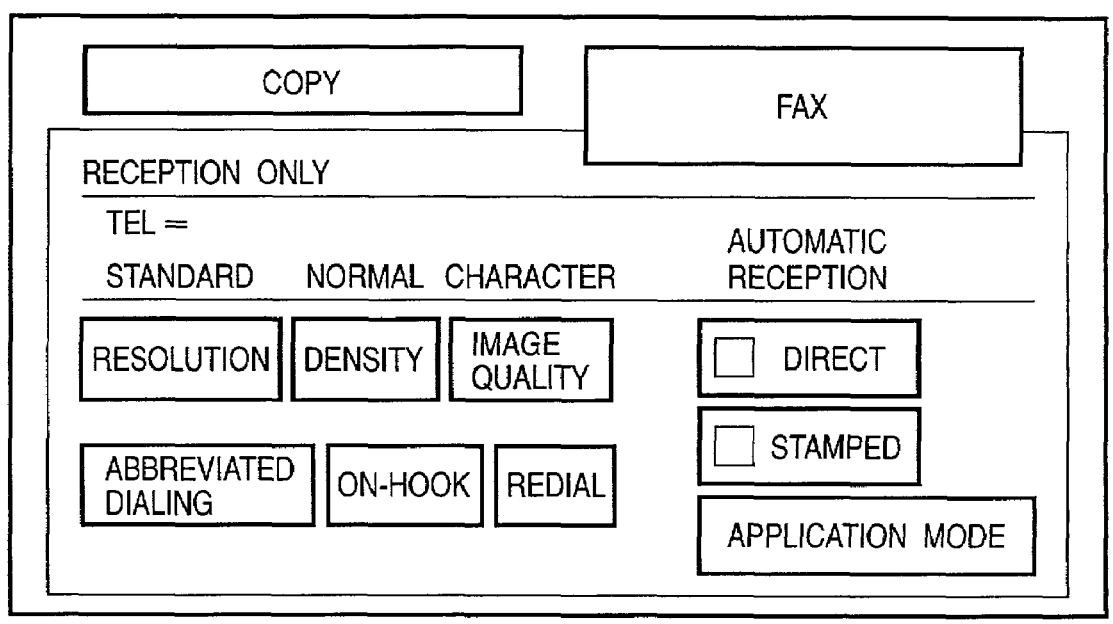
FIG. 25 is a schematic view showing a window displayed when the function limitation mode is set in FIG. 23.

Likewise, the display in FIG. 23 is changed to that shown in FIG. 25. With this operation, a window is displayed, which indicates that transmission is inhibited, and only reception is permitted because a white or black streak is produced in read operation in the facsimile transmission mode.

Fourth Embodiment

In the first to third embodiments, when abnormal data is detected, the following abnormal data replacement processing or read position change processing may be performed. If abnormal data cannot be avoided even by such processing, the above mode or function limitation may then be performed.

Figure 26:
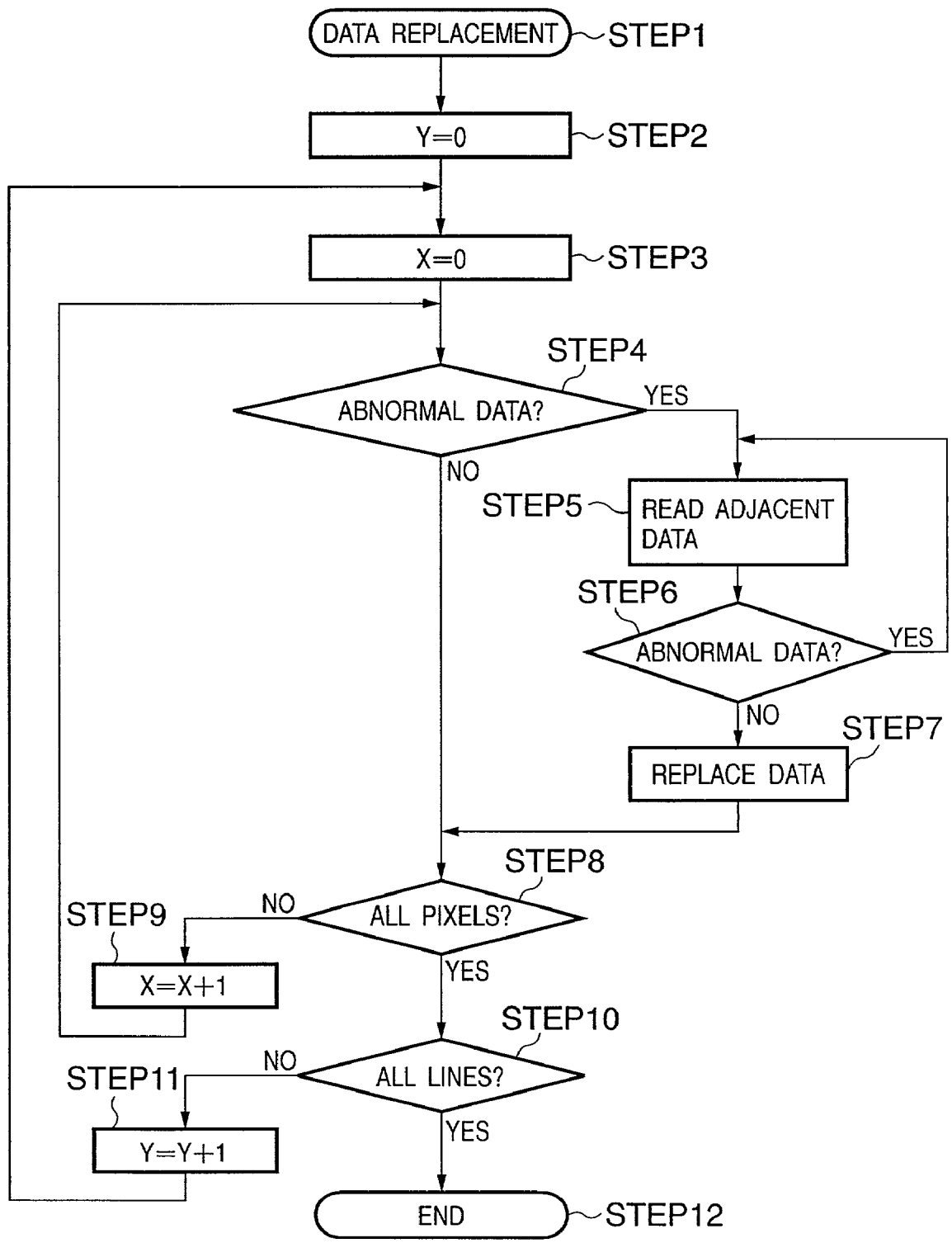
FIG. 26 is a flow chart showing replacement processing for abnormal data read as a detected white/black streak.

Data replacement processing will be described with reference to FIG. 26.

Coordinate data y and x are initialized to 0 (steps 2 and 3). If it is determined in the preceding processing flow that a read pixel is abnormal data (step 4), adjacent data is read (step 5). If the read adjacent data is abnormal data, another adjacent data is read (step 6). Adjacent data which is not abnormal data is read and the abnormal data is replaced with the adjacent data (step 7). This data replacement may be performed by, for example, simply copying adjacent data or replacing the abnormal data with average data of a plurality of adjacent data. This processing is performed in this manner for all the pixels in the x direction and all the lines in the y direction (steps 8 to 11).

With the above processing, white and black streaks produced in flow scanning of originals are detected, and the streak data are replaced with other data, thus implementing image correction.

Read position change processing will be described next with reference to FIGS. 27 to 31.

Figure 27:
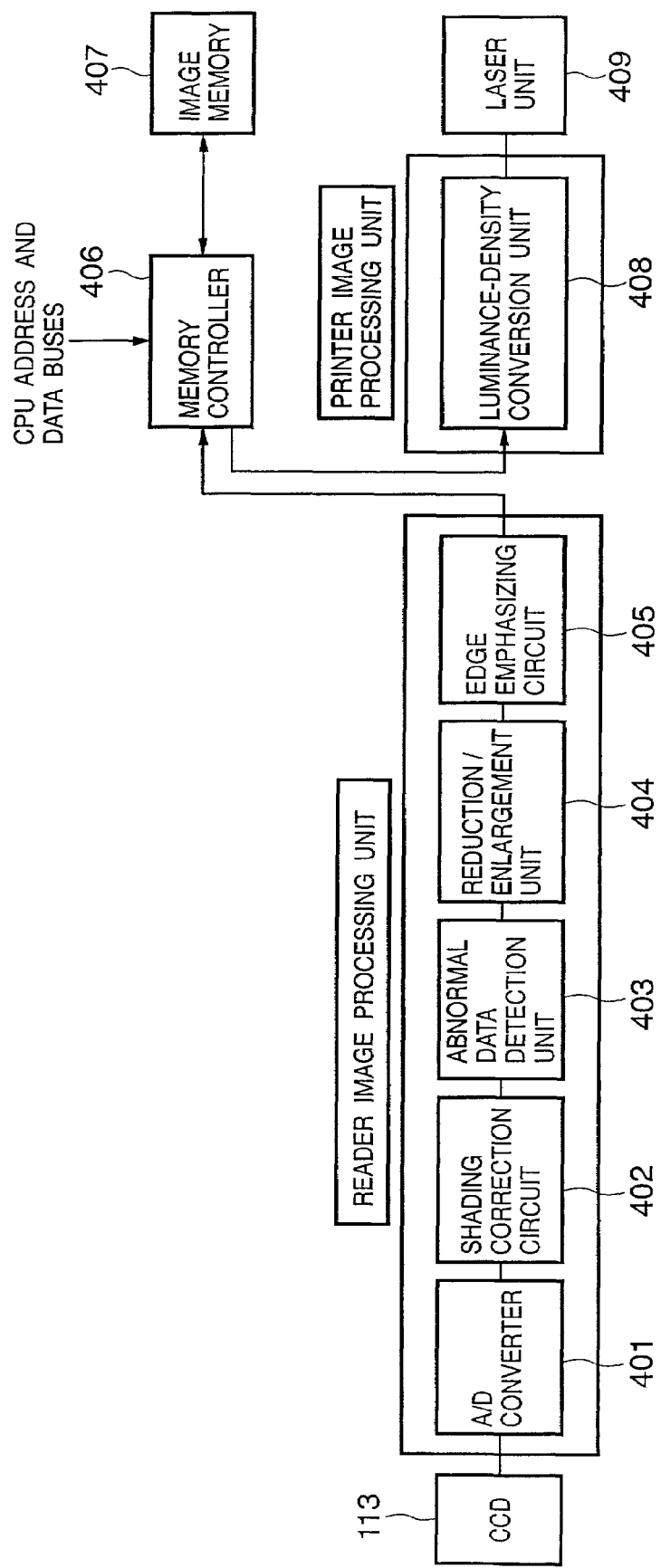
FIG. 27 is a schematic view showing the detailed arrangement of an image processing unit 206 in the fourth embodiment.

FIG. 27 is a schematic view showing the detailed arrangement of an image processing unit 206 in the fourth embodiment.

This image processing unit differs from the image processing unit 206 shown in FIG. 4 in an abnormal data detection unit 403. This embodiment is configured to detect abnormal data produced in flow scanning by using the abnormal data detection unit 403 instead of the image memory.

Figure 28:
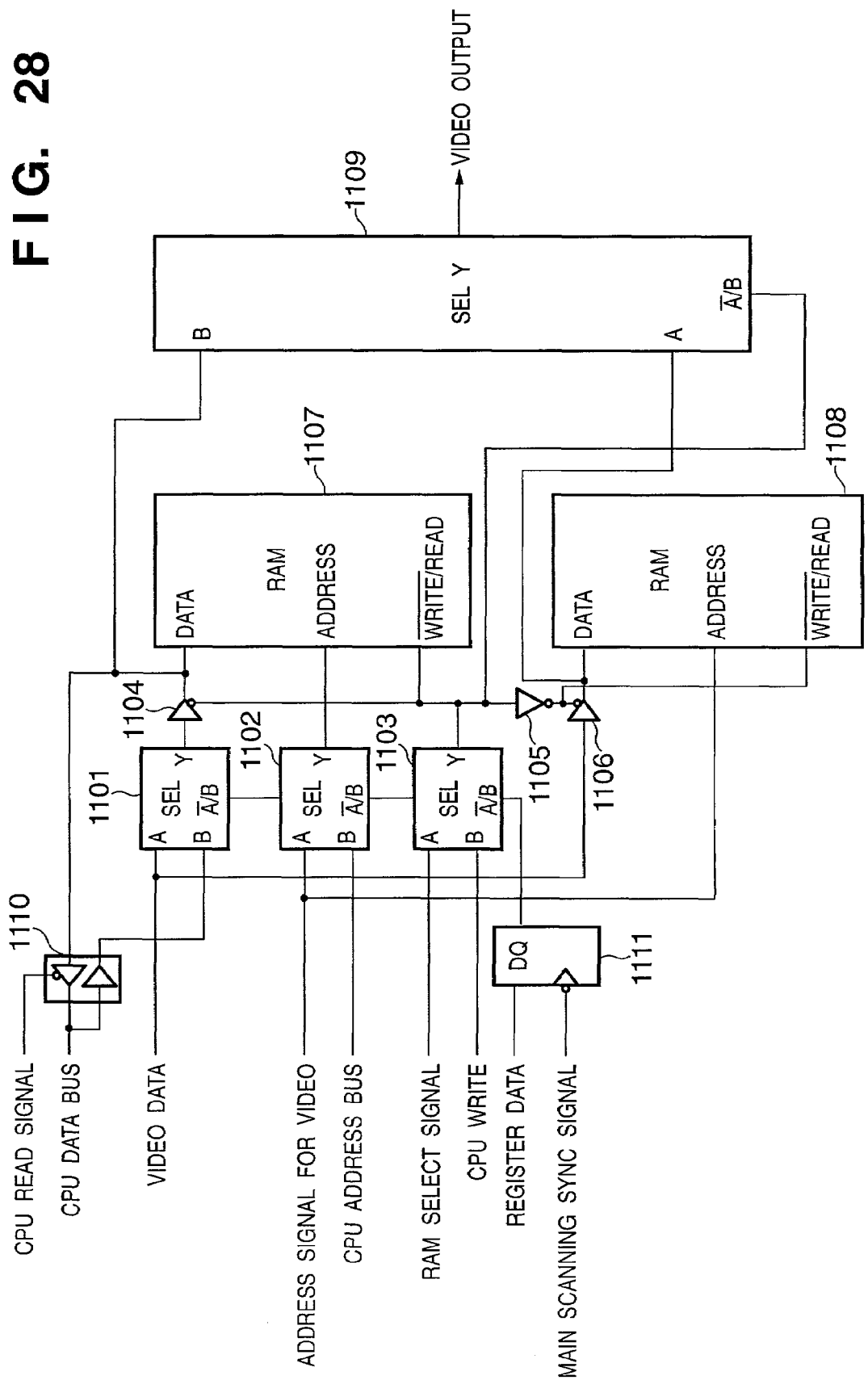
FIG. 28 is a schematic view showing the arrangement of an abnormal data detection unit.
Figure 29:
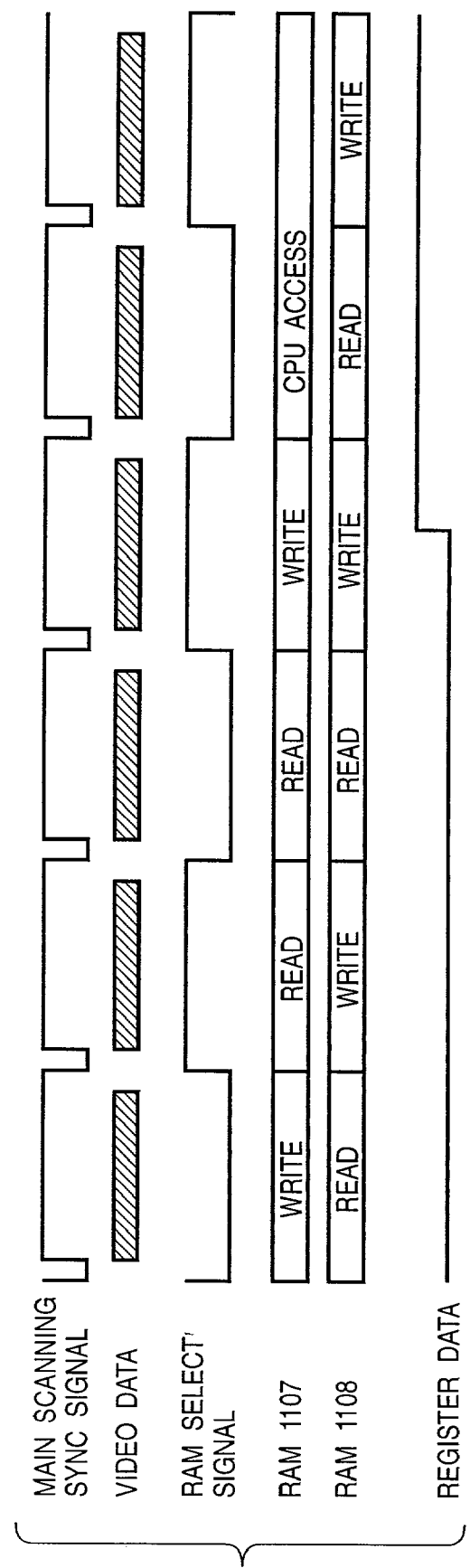
FIG. 29 is a timing chart in the abnormal data detection unit.
Figure 30:
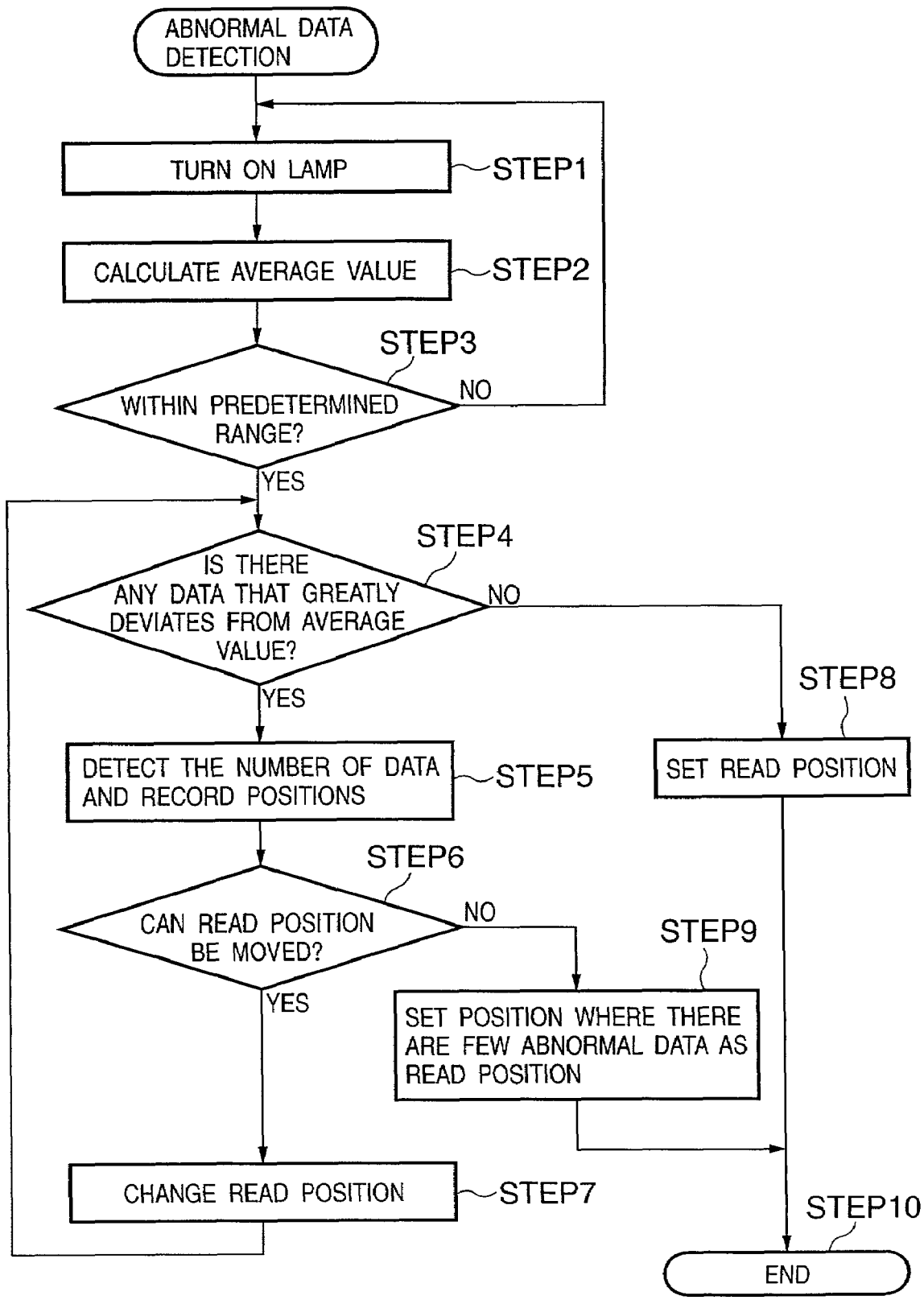
FIG. 30 is a flow chart showing abnormal data detection processing.
Figure 31:
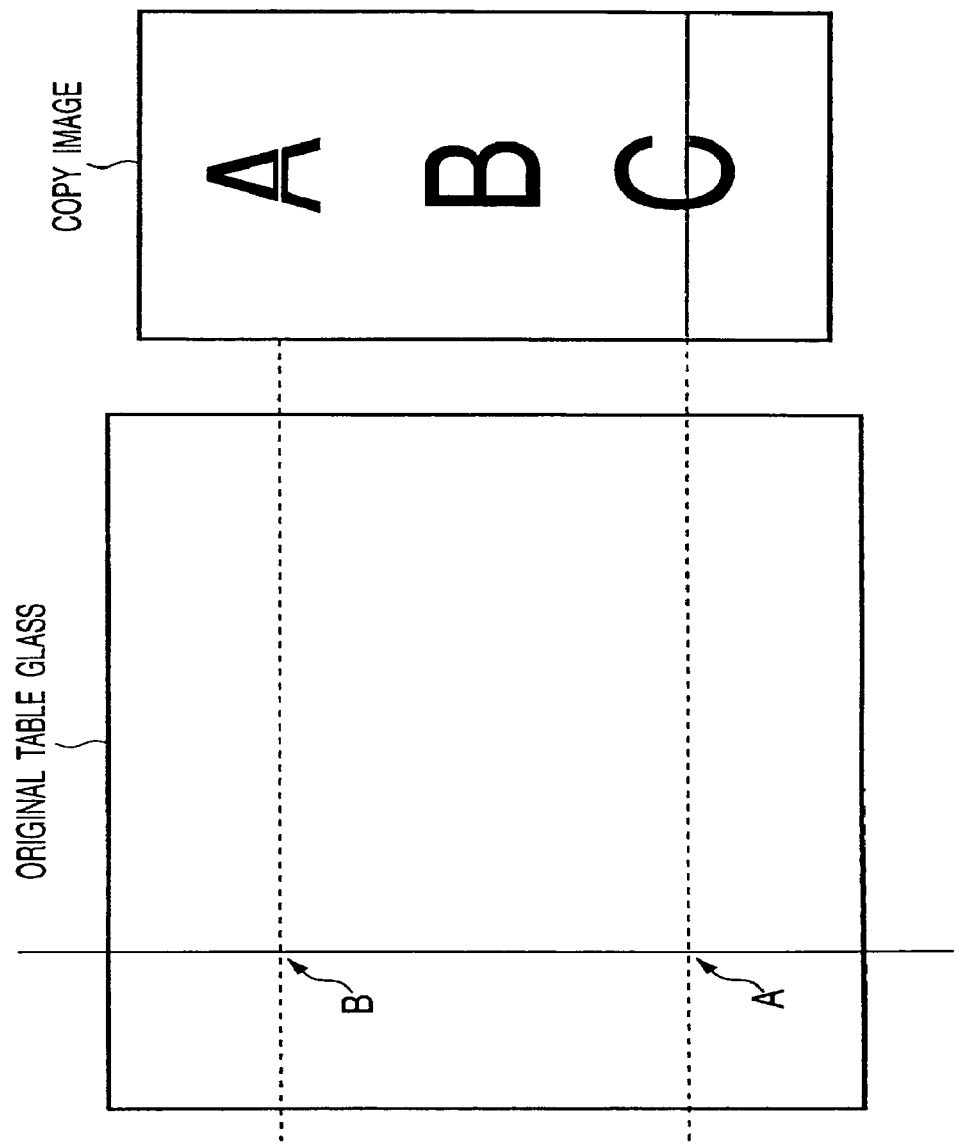
FIG. 31 is a view showing an example where a streak has formed on a copy sheet due to an influence of a flaw or dust etc. on an original table in flow scanning.

The abnormal data detection unit 403 has the arrangement shown in FIG. 28. FIG. 29 is a timing chart.

Data processed by a shading correction circuit 402 in FIG. 27 is input as video data to a RAM 1107 through a selector 1101 and buffer 1104. This data is also input to a RAM 1108 through a buffer 1106. The address signal generated by an address generating unit (not shown) is input to the RAMs 1107 and 1108, and data is written/read in/from the memory in accordance with the designated address. In addition, a RAM select signal is input to the buffer 1104 through a selector 1103 and to the buffer 1106 through an inverter 1105. With this RAM select signal, inputting of video data to the RAMs 1107 and 1108 is controlled.

Write/read operation of the memory is toggle-controlled at the period of a main scanning sync signal. With this operation, while video data is written in the RAM 1107, data is read out from the RAM 1108 and output to the succeeding block through a selector 1109. Likewise, while data is written in the RAM 1108, data is output from the RAM 1107.

Register data controls selectors 1101, 1102, and 1103 through a flip-flop 1111. The register data is normally at LOW level, and the video data system is selected. In reading/writing data from/in the RAM, the CPU sets this register data to HIGH level to switch the data from the video system to the CPU system. Note that the CPU can access only the RAM 1107. The data bus of the CPU is connected to the data bus of the RAM 1107 through a bidirectional buffer and the selector 1101, and the buffer 1104. The buffer 1104 is controlled by a CPU write signal. When this signal is set at LOW level, data is written in the memory.

In this manner, the CPU loads video data at a predetermined timing to detect abnormal data. The flow of abnormal data detection will be described with reference to FIG. 30.

This flow is executed before copy operation.

In step 1, the optical system moves to the flow scanning position, the lamp is turned on, and light reflected by a belt 106 is captured by the CCD 113. The average value of data output from the CCD 113 at this time is calculated (step 2), and it is checked whether the average value falls within a predetermined range (step 3.) Light amount adjusting is performed to prevent difficulty in detecting abnormal data due to an excessively low or high amount of light throughout the data. In step 4, it is checked whether there is any data that greatly deviates from the average value.

If there are data that greatly deviate from the average value, the number of data is counted, and their positions are recorded (step 5). Subsequently, if the read position can be moved (step 6), the read position is changed, and light reflected by the belt 106 is captured by the CCD 113. The same processing as that described above is then repeated.

If a place where there is no data that greatly deviates the average value is not detected within the movable range, a place where the smallest number of abnormal data are detected is set as a read position (steps 6 to 9). If no abnormal data that greatly deviates from the average value is detected in step 4, the current position is set as a read position (step 8).

In this manner, a read position is set, and actual read operation is performed. This operation is the same as that in the first embodiment described above, and hence a description thereof will be omitted.

The present invention incorporates a case where the respective functions of the image reading apparatus of each embodiment described above are realized by supplying the program codes of software for realizing the functions of each embodiment to the computer (CPU or MPU) in an apparatus or system connected to the above devices and operating the respective devices in accordance with the programs stored in the computer in the system or apparatus.

In this case, the program codes of the software themselves realize the functions of the above-described embodiments, and the program codes themselves and a means for supplying the program codes to the computer, e.g., a storage medium storing the program codes, constitute the present invention. As a storage medium for supplying the program codes, a floppy disk, a hard disk, an optical disk, a magnetooptical disk, a CD-ROM, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the above embodiments, images free from the influence of abnormal pixels can be output by detecting the positions of abnormal pixels such as white and black streaks and imposing limitations on predetermined functions.

The present invention is not limited to the above embodiments and various changes and modifications can be made within the spirit and scope of the present invention. Therefore, to apprise the public of the scope of the present invention, the following claims are made.

What is claimed is:

1. An image forming apparatus comprising:
    an original convey unit adapted to move an original in a sub-scanning direction;
    an image reading unit adapted to read the original while moving the original by using said original convey unit and output image data;
    an abnormality detection unit adapted to detect abnormal data output from said image reading unit before said image reading unit reads the original;
    an image forming unit adapted to form an image, which is read from the original by said image reading unit, on a sheet; and
    a control unit adapted to limit a size of the sheet in accordance with a position of the abnormal data so that the abnormal data does not appear on the image formed on the sheet by said image forming unit.

2. The apparatus according to claim 1, wherein said abnormality detection unit detects continuity and a position of the abnormal data read by said image reading unit in the main scanning direction.

3. The apparatus according to claim 1, wherein said abnormality detection unit detects continuity, a position, and a width of the abnormal data in the main scanning direction.

4. An image forming method of reading an original while moving the original in a sub-scanning direction and outputting image data, comprising:
    detecting abnormal data before reading the original;
    limiting a size of a sheet in accordance with a position of the abnormal data so that the abnormal data does not appear on the image formed on the sheet by said image forming unit; and
    forming an image, which is read from the original, on the sheet.

5. The method according to claim 4, wherein the abnormality detection, continuity and a position of the abnormal data are detected in the main scanning direction.

6. The method according to claim 4, wherein in the abnormality detection, continuity, a position, and a width of the abnormal data are detected in the main scanning direction.

7. A program characterized by causing a computer to execute the image forming method defined in claim 4.

8. A storage medium characterized by storing the program defined in claim 7 as a computer-readable program.

* * * * *

UNITED STATES PATENT AND TRADEMARK OFFICE
CERTIFICATE OF CORRECTION

PATENT NO. : 7,349,108 B2  Page 1 of 1
APPLICATION NO. : 10/021524
DATED : March 25, 2008
INVENTOR(S) : Akio Ito It is certified that error appears in the above-identified patent and that said Letters Patent is hereby corrected as shown below:

On the cover page, item (56) References, please replace "JP 2003-310820" with --JP-2000-310820--.

Signed and Sealed this

Twenty-fourth Day of June, 2008

JON W. DUDAS
*Director of the United States Patent and Trademark Office*